United States Patent
Ishikawa

(10) Patent No.: US 9,172,858 B2
(45) Date of Patent: Oct. 27, 2015

(54) APPARATUS AND METHOD FOR CONTROLLING SETTINGS OF AN IMAGING OPERATION

(71) Applicant: Sony Corporation, Tokyo (JP)

(72) Inventor: Takuya Ishikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 203 days.

(21) Appl. No.: 13/676,452

(22) Filed: Nov. 14, 2012

(65) Prior Publication Data

US 2013/0128070 A1    May 23, 2013

(30) Foreign Application Priority Data

Nov. 21, 2011  (JP) .................................. 2011-253547

(51) Int. Cl.
  *H04N 5/232*   (2006.01)
  *H04N 1/00*    (2006.01)
  *G06F 3/16*    (2006.01)
  *G06F 21/32*   (2013.01)

(52) U.S. Cl.
  CPC ........... *H04N 5/232* (2013.01); *H04N 5/23219* (2013.01); *G06F 3/167* (2013.01); *G06F 21/32* (2013.01); *H04N 1/00403* (2013.01); *H04N 5/23254* (2013.01)

(58) Field of Classification Search
  None
  See application file for complete search history.

(56) References Cited

U.S. PATENT DOCUMENTS

| | | | |
|---|---|---|---|
| 6,850,265 B1 * | 2/2005 | Strubbe et al. | 348/14.05 |
| 8,385,645 B2 | 2/2013 | Ogawa | |
| 8,610,812 B2 * | 12/2013 | Kim | 348/333.12 |
| 8,675,096 B2 * | 3/2014 | Kawanishi et al. | 348/231.4 |
| 2003/0053680 A1 * | 3/2003 | Lin et al. | 382/154 |
| 2009/0059027 A1 * | 3/2009 | Iwamoto | 348/222.1 |

FOREIGN PATENT DOCUMENTS

| | | |
|---|---|---|
| JP | 2004-133637 A | 4/2004 |
| JP | 2010-067102 A | 3/2010 |
| JP | 2010-147587 A | 7/2010 |

* cited by examiner

*Primary Examiner* — Timothy J Henn
*Assistant Examiner* — Quan Pham
(74) *Attorney, Agent, or Firm* — Hazuki International, LLC

(57) ABSTRACT

An information processing apparatus includes a control unit configured to perform control for selecting settings for an imaging operation of an imaging unit based on surrounding sound obtained by a sound obtaining unit and an image generated by the imaging unit.

11 Claims, 24 Drawing Sheets

FIG. 3

|   | TYPE OF OBJECT | FEATURE AMOUNT (RELATING TO IMAGE) | CAMERA CONTROL PARAMETER (RELATING TO IMAGE) |
|---|---|---|---|
| 1 | HORSE | ... | ... |
| 2 | FISH | ... | ... |
| 3 | HUMAN FACE | ... | ... |
| 4 | GRASS | ... | ... |
| 5 | WATERFALL | ... | ... |
| 6 | VEHICLE | ... | ... |
| 7 | AIRCRAFT | ... | ... |
| ⋮ | ⋮ | ⋮ | ⋮ |

FIG. 5

| | TYPE OF OBJECT | PARAMETER CORRECTION INFORMATION |
|---|---|---|
| 1 | SUBJECT MOVING AT HIGH SPEED | CORRECT TO RAISE SHUTTER SPEED |
| 2 | SUBJECT MOVING AT LOW SPEED | CORRECT TO LOWER SHUTTER SPEED |
| 3 | SUBJECT WHICH IS POSITIONED NEAR IMAGING APPARATUS | CORRECT TO RAISE SHUTTER SPEED |
| 4 | SUBJECT WHICH IS POSITIONED AT A DISTANT LOCATION FROM IMAGING APPARATUS | CORRECT TO LOWER SHUTTER SPEED |
| ⋮ | ⋮ | ⋮ |

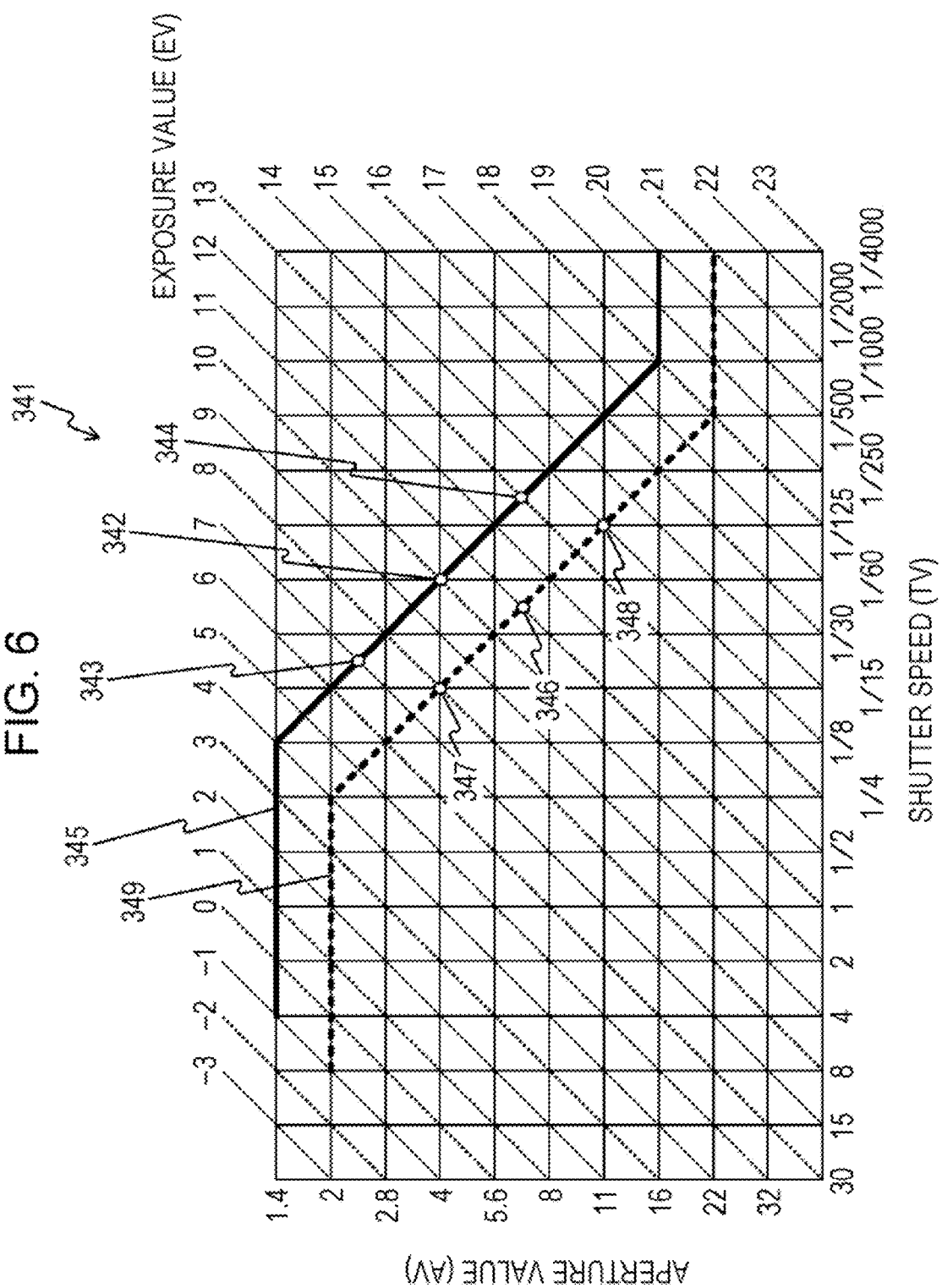

| DETERMINATION RESULT BASED ON SOUND INFORMATION | RUNNING HORSE |
|---|---|
| DETERMINATION RESULT BASED ON IMAGE INFORMATION | HORSE |
| WHETHER OR NOT TWO DETERMINATION RESULTS COINCIDE | COINCIDE (SUBSTANTIALLY COINCIDE) |

SELECT CAMERA CONTROL PARAMETER

| SELECTED CAMERA CONTROL PARAMETER | CAMERA CONTROL PARAMETER BASED ON SOUND INFORMATION (FIRST PARAMETER) |
|---|---|

FIG. 10A

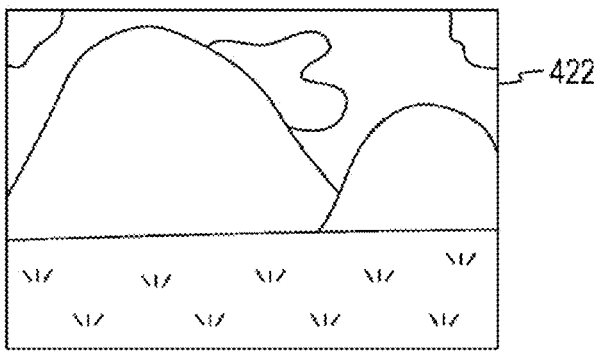

FIG. 10B

| DETERMINATION RESULT BASED ON SOUND INFORMATION | RUNNING HORSE |
|---|---|
| DETERMINATION RESULT BASED ON IMAGE INFORMATION | GRASS, MOUNTAINS |
| WHETHER OR NOT TWO DETERMINATION RESULTS COINCIDE | NOT COINCIDE |

⇩ SELECT CAMERA CONTROL PARAMETER

| SELECTED CAMERA CONTROL PARAMETER | CAMERA CONTROL PARAMETER BASED ON IMAGE INFORMATION (SECOND PARAMETER) |
|---|---|

FIG. 10C

| DETERMINATION RESULT BASED ON SOUND INFORMATION | NONE |
|---|---|
| DETERMINATION RESULT BASED ON IMAGE INFORMATION | GRASS, MOUNTAINS |
| WHETHER OR NOT TWO DETERMINATION RESULTS COINCIDE | NOT COINCIDE |

⇩ SELECT CAMERA CONTROL PARAMETER

| SELECTED CAMERA CONTROL PARAMETER | CAMERA CONTROL PARAMETER BASED ON IMAGE INFORMATION (SECOND PARAMETER) |
|---|---|

| DETERMINATION RESULT BASED ON SOUND INFORMATION | NONE |
|---|---|
| DETERMINATION RESULT BASED ON IMAGE INFORMATION | HORSE |
| WHETHER OR NOT TWO DETERMINATION RESULTS COINCIDE | NOT COINCIDE |

SELECT CAMERA CONTROL PARAMETER

| SELECTED CAMERA CONTROL PARAMETER | CAMERA CONTROL PARAMETER BASED ON IMAGE INFORMATION (SECOND PARAMETER) |
|---|---|

FIG. 16A

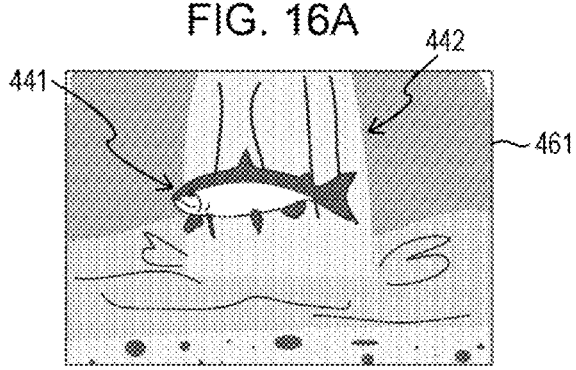

FIG. 16B

| DETERMINATION RESULT BASED ON SOUND INFORMATION | WATERFALL |
|---|---|
| DETERMINATION RESULT BASED ON IMAGE INFORMATION | FISH, WATERFALL |
| WHETHER OR NOT TWO DETERMINATION RESULTS COINCIDE | COINCIDE |
| PRESENCE OF OBJECT OTHER THAN OBJECT FOR WHICH TWO DETERMINATION RESULTS OF WHICH COINCIDE | PRESENT |

 SELECT CAMERA CONTROL PARAMETER

| SELECTED CAMERA CONTROL PARAMETER | CAMERA CONTROL PARAMETER BASED ON IMAGE INFORMATION (SECOND PARAMETER) |
|---|---|

FIG. 17A

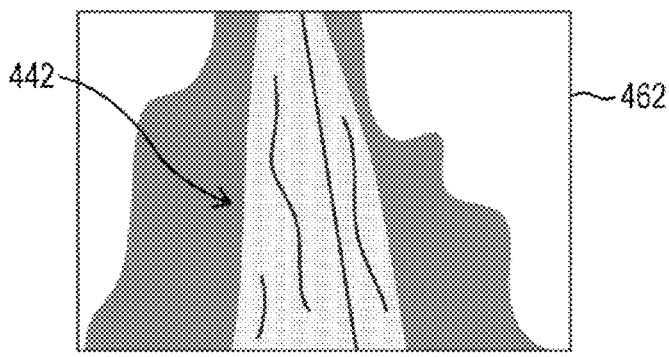

FIG. 17B

| DETERMINATION RESULT BASED ON SOUND INFORMATION | WATERFALL |
|---|---|
| DETERMINATION RESULT BASED ON IMAGE INFORMATION | WATERFALL |
| WHETHER OR NOT TWO DETERMINATION RESULTS COINCIDE | COINCIDE |
| PRESENCE OF OBJECT OTHER THAN OBJECT FOR WHICH TWO DETERMINATION RESULTS OF WHICH COINCIDE | NONE |

 SELECT CAMERA CONTROL PARAMETER

| SELECTED CAMERA CONTROL PARAMETER | CAMERA CONTROL PARAMETER BASED ON SOUND INFORMATION (FIRST PARAMETER) |
|---|---|

FIG. 18A

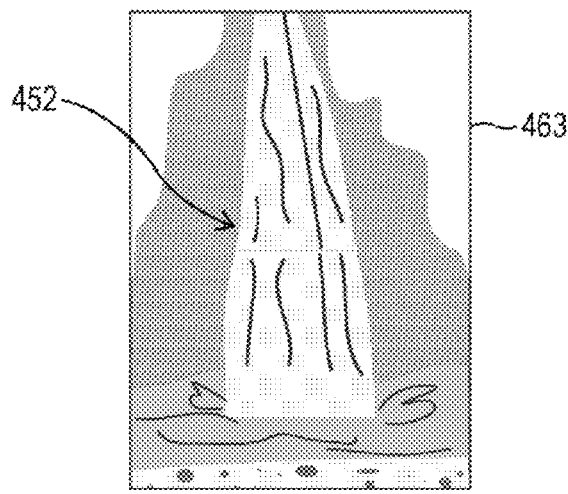

FIG. 18B

| DETERMINATION RESULT BASED ON SOUND INFORMATION | WATERFALL |
|---|---|
| DETERMINATION RESULT BASED ON IMAGE INFORMATION | WATERFALL |
| WHETHER OR NOT TWO DETERMINATION RESULTS COINCIDE | COINCIDE |
| PRESENCE OF OBJECT OTHER THAN OBJECT FOR WHICH TWO DETERMINATION RESULTS OF WHICH COINCIDE | NONE |

 SELECT CAMERA CONTROL PARAMETER

| SELECTED CAMERA CONTROL PARAMETER | CAMERA CONTROL PARAMETER BASED ON SOUND INFORMATION (FIRST PARAMETER) |
|---|---|

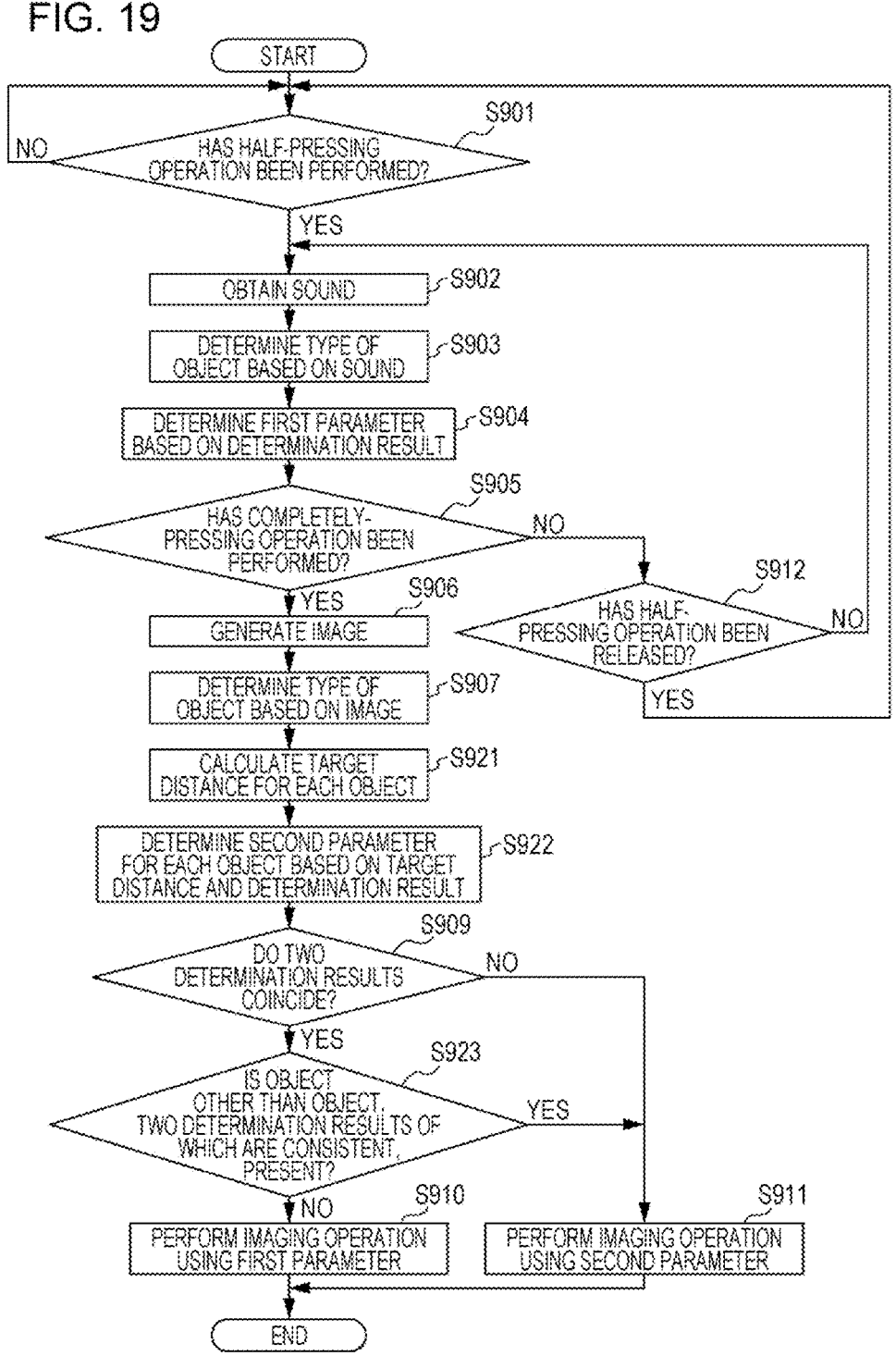

FIG. 21A

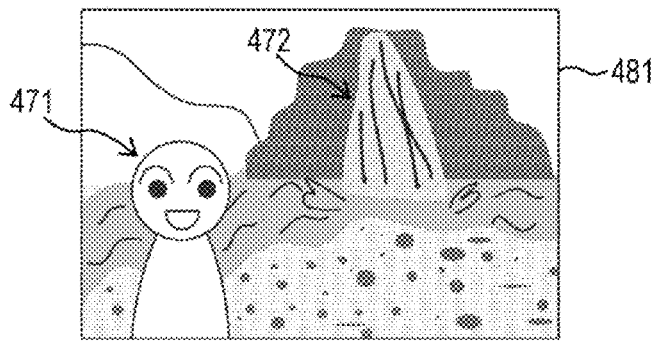

FIG. 21B

| | |
|---|---|
| DETERMINATION RESULT BASED ON SOUND INFORMATION | WATERFALL |
| DETERMINATION RESULT BASED ON IMAGE INFORMATION | PERSON, WATERFALL |
| WHETHER OR NOT TWO DETERMINATION RESULTS COINCIDE | COINCIDE |
| PRESENCE OF PERSON | PRESENT |

 SELECT CAMERA CONTROL PARAMETER

| | |
|---|---|
| SELECTED CAMERA CONTROL PARAMETER | CAMERA CONTROL PARAMETER BASED ON IMAGE INFORMATION (SECOND PARAMETER) |

FIG. 22A

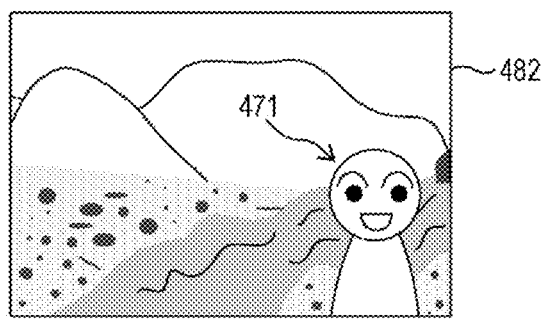

FIG. 22B

| DETERMINATION RESULT BASED ON SOUND INFORMATION | WATERFALL |
|---|---|
| DETERMINATION RESULT BASED ON IMAGE INFORMATION | PERSON, MOUNTAINS |
| WHETHER OR NOT TWO DETERMINATION RESULTS COINCIDE | NOT COINCIDE |
| PRESENCE OF PERSON | PRESENT |

 SELECT CAMERA CONTROL PARAMETER

| SELECTED CAMERA CONTROL PARAMETER | CAMERA CONTROL PARAMETER BASED ON IMAGE INFORMATION (SECOND PARAMETER) |
|---|---|

| DETERMINATION RESULT BASED ON SOUND INFORMATION | WATERFALL |
|---|---|
| DETERMINATION RESULT BASED ON IMAGE INFORMATION | WATERFALL |
| WHETHER OR NOT TWO DETERMINATION RESULTS COINCIDE | COINCIDE |
| PRESENCE OF PERSON | NONE |

SELECT CAMERA CONTROL PARAMETER

| SELECTED CAMERA CONTROL PARAMETER | CAMERA CONTROL PARAMETER BASED ON SOUND INFORMATION (FIRST PARAMETER) |
|---|---|

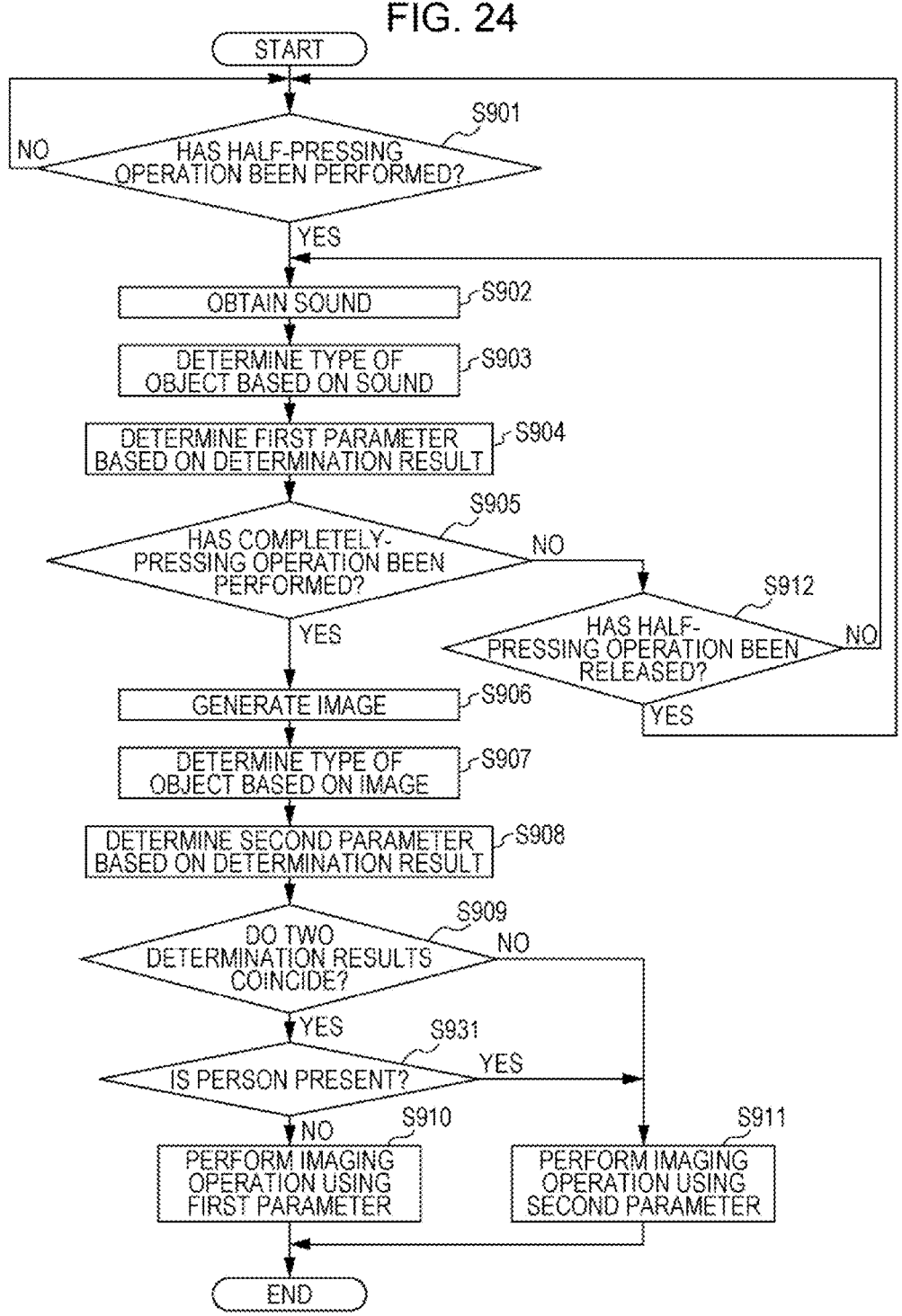

APPARATUS AND METHOD FOR CONTROLLING SETTINGS OF AN IMAGING OPERATION

CROSS-REFERENCE TO RELATED APPLICATION

The present application claims priority from Japanese Patent Application No. JP 2011-253547 filed in the Japanese Patent Office on Nov. 21, 2011, the entire content of which is incorporated herein by reference.

BACKGROUND

The present disclosure relates to an information processing apparatus. More specifically, the present disclosure relates to an information processing apparatus, an imaging apparatus, and an information processing method which are designed to control an imaging operation, and a program which causes a computer to execute the method.

In recent years, information processing apparatuses (imaging apparatuses such as a digital still camera) which image a target such as a person, generate an image (image data), and record the generated image (image data) as image content (image file) have been widely used. In order to clearly record the image (image data) to be recorded, it is important to appropriately set parameters relating to an imaging operation when the information processing apparatus performs an imaging operation. For this reason, multiple techniques to appropriately set the parameters relating to the imaging operation have been proposed.

For example, an imaging apparatus which analyzes feature amounts of an audio signal obtained during a target imaging operation and controls image processing parameters based on the feature amounts of the analyzed audio signal has been proposed (see Japanese Unexamined Patent Application Publication No. 2010-147587, for example).

SUMMARY

According to the aforementioned technique in the related art, it is possible to control parameters relating to a target imaging operation with the use of an audio signal obtained during the imaging operation.

However, there may be a case in which an object (that is, an object which is not included in an imaging range) other than an object which is included in the imaging range generates sound, for example. In addition, there may also be a case in which objects other than a main object (an object which a person who captures an image focuses on) generate sound among objects included in an imaging range. For this reason, it is important to appropriately select settings for an imaging operation in consideration of a relationship between an object which generates sound and an object other than the object which generates sound.

It is desirable to appropriately select settings for an imaging operation.

According to a first embodiment of the present disclosure, there are provided an information processing apparatus, an information processing method thereof, and a program for causing a computer to execute the method, the information processing apparatus including: a control unit configured to perform control for selecting settings for an imaging operation of an imaging unit based on surrounding sound obtained by a sound obtaining unit and an image generated by the imaging unit. In so doing, there is an effect that the settings for the imaging operations by the imaging unit are selected based on the surrounding sound obtained by the sound obtaining unit and the image generated by the imaging unit.

In the first embodiment, the information processing apparatus may further include: a first determination unit configured to determine an object generating sound based on the surrounding sound obtained by the sound obtaining unit; and a second determination unit configured to determine an object included in the image based on the image generated by the imaging unit, and the control unit may select the settings based on a determination result by the first determination unit and a determination result by the second determination unit. In so doing, there is an effect that the settings for the imaging operation of the imaging unit are selected based on the determination result by the first determination unit and the determination result by the second determination unit.

In the first embodiment, the control unit may be configured to select the settings based on a comparison result between a first object as the object determined by the first determination unit and a second object as the object determined by the second determination unit. In so doing, there is an effect that the settings for the imaging operation of the imaging unit are determined based on the comparison result between the object (first object) determined by the first determination unit and the object (second object) determined by the second determination unit.

In the first embodiment, the control unit may be configured to select a first parameter as a parameter relating to the settings based on the first object, select a second parameter as a parameter relating to the settings based on the second object, and select the settings with the use of any of the first parameter and the second parameter based on whether or not the first object coincides with the second object. In so doing, there is an effect that the settings for the imaging operation of the imaging unit are selected with the use of any of the first parameter and the second parameter based on whether or not the first object coincides with the second object.

In the first embodiment, the control unit may be configured to select the settings with the use of the first parameter when the first object coincides with the second object and select the settings with the use of the second parameter when the first object does not coincide with the second object. In so doing, there is an effect that the settings for the imaging operation of the imaging unit are selected with the use of the first parameter when the first object coincides with the second object and settings for the imaging operation of the imaging unit are selected with the use of the second parameter when the first object does not coincide with the second object.

In the first embodiment, the first determination unit may be configured to determine the first object and at least one of a moving state and a target distance relating to the first object, and the control unit may be configured to correct the first parameter based on at least one of the moving state and the target distance relating to the first object. In so doing, there is an effect that the first parameter is corrected based on at least one of the moving state and the target distance relating to the first object.

In the first embodiment, the second determination unit may be configured to determine the second object and at least one of a moving state and a target distance relating to the second object, and the control unit may be configured to correct the second parameter based on at least one of the moving state and the target distance relating to the second object. In so doing, there is an effect that the second parameter is corrected based on at least one of the moving state and the target distance relating to the second object.

In the first embodiment, the information processing apparatus may further include a target distance obtaining unit configured to obtain a target distance relating to each object included in the image generated by the imaging unit, wherein the control unit may be configured to select the settings with the use of any of the first parameter and the second parameter based on whether or not another object relating to a target distance which is different from a target distance relating to the first object is included in the image generated by the imaging unit. In so doing, there is an effect that the settings for the imaging operation of the imaging unit are selected with the use of any of the first parameter and the second parameter based on whether or not another object relating to a target distance which is different from a target distance relating to the first object is included in the image generated by the imaging unit.

In the first embodiment, the second determination unit may be configured to determine whether or not a specific object is included in the image generated by the imaging unit, and the control unit may be configured to select the settings with the use of any of the first parameter and the second parameter based on whether or not the specific object is included in the image generated by the imaging unit. In so doing, there is an effect that the settings for the imaging operation of the imaging unit are selected with the use of any of the first parameter and the second parameter based on whether or not a specific object is included in the image generated by the imaging unit.

In the first embodiment, the second determination unit may be configured to determine whether or not a human face as the specific object is included. In so doing, there is an effect that it is determined whether or not a human face is included as the specific object.

According to a second embodiment of the present disclosure, there are provided an imaging apparatus, a control method thereof, and a program which causes a computer to execute the method, the imaging apparatus including: a sound obtaining unit configured to obtain surrounding sound; an imaging unit configured to image a target and generates an image; and a control unit configured to perform control for selecting settings for an imaging operation of the imaging unit based on the surrounding sound obtained by the sound obtaining unit and the image generated by the imaging unit. In so doing, there is an effect that the settings for the imaging operation of the imaging unit are selected based on the surrounding sound obtained by the sound obtaining unit and the image generated by the imaging unit.

According to the present disclosure, an excellent effect that it is possible to appropriately select settings for an imaging operation can be achieved.

BRIEF DESCRIPTION OF THE DRAWINGS

FIG. 3 is a diagram schematically showing an example of contents stored on an image determination information storage unit according to the first embodiment of the present disclosure;

FIG. 5 is a diagram schematically showing an example of contents stored on a parameter correction information storage unit according to the first embodiment of the present disclosure;

FIG. 6 is a diagram showing an example of a program chart stored on a program chart storing unit according to the first embodiment of the present disclosure;

FIGS. 10A to 10C are diagrams showing a relationship between an image generated by the imaging unit and a camera control parameter selected by the control unit according to the first embodiment of the present disclosure;

FIGS. 16A and 16B are diagrams showing a relationship between an image generated by the imaging unit and a camera control parameter selected by the control unit according to the second embodiment of the present disclosure;

FIGS. 17A and 17B are diagrams showing a relationship between an image generated by the imaging unit and a camera control parameter selected by the control unit according to the second embodiment of the present disclosure;

FIGS. 18A and 18B are diagrams showing a relationship between an image generated by the imaging unit and a camera control parameter selected by the control unit according to the second embodiment of the present disclosure;

FIG. 19 is a flowchart showing an example of a processing procedure for camera control parameter selection processing by the imaging apparatus according to the second embodiment of the present disclosure;

FIGS. 21A and 21B are diagrams showing a relationship between an image generated by the imaging unit and a camera control parameter selected by the control unit according to the third embodiment of the present disclosure;

FIGS. 22A and 22B are diagrams showing a relationship between an image generated by the imaging unit and a camera control parameter selected by the control unit according to the third embodiment of the present disclosure;

FIG. 24 is a flowchart showing an example of a processing procedure for camera control parameter selection processing by the imaging apparatus according to the third embodiment of the present disclosure.

DETAILED DESCRIPTION OF EMBODIMENTS

Hereinafter, description will be given of embodiments for implementing the present disclosure (hereinafter, referred to as embodiments). The description will be given in the following order.

1. First Embodiment (camera control parameter selection control: an example in which camera control parameters are determined based on sound around an imaging apparatus and an image generated by an imaging unit)
2. Second Embodiment (camera control parameter determination control: an example in which camera control parameters are determined based on whether or not a plurality of objects with different target distances are included in an imaging range)
3. Third Embodiment (camera control parameter determination control: an example in which camera control parameters are determined based on whether or not a person is included in an imaging range)

First Embodiment
Configuration Example of Imaging Apparatus

Figure 1:
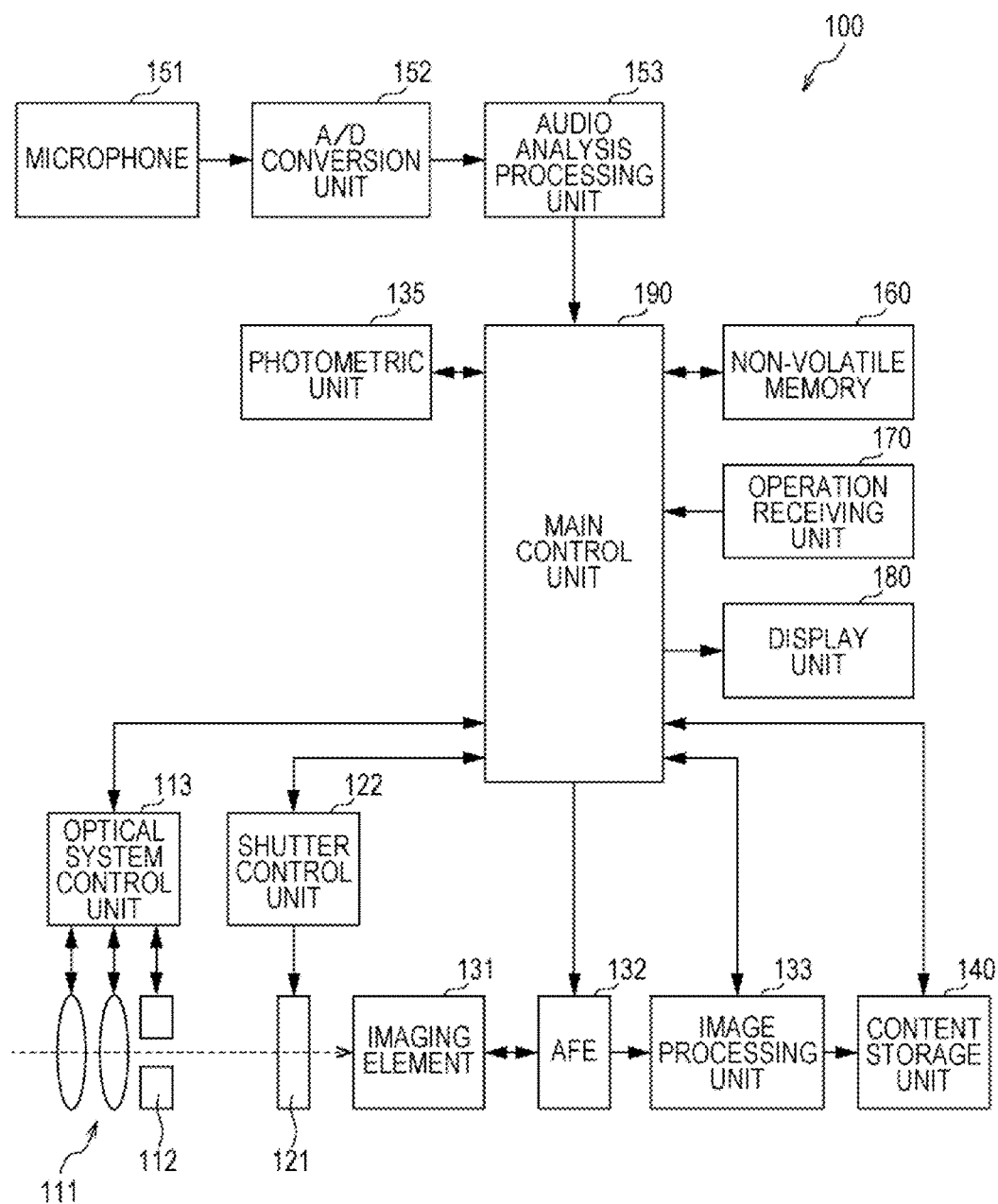
FIG. 1 is a block diagram showing an internal configuration example of an imaging apparatus according to a first embodiment of the present disclosure.

FIG. 1 is a block diagram showing an internal configuration example of an imaging apparatus 100 according to a first embodiment of the present disclosure.

The imaging apparatus 100 is provided with a lens group 111, a diaphragm 112, an optical system control unit 113, a shutter unit 121, a shutter control unit 122, an imaging element 131, and an AFE (Analog-Front End) 132. In addition, the imaging apparatus 100 is provided with an image processing unit 133, a photometric unit 135, a content storage unit 140, a microphone 151, an A/D (Analog/Digital) conversion unit 152, and an audio analysis processing unit 153. Moreover, the imaging apparatus 100 is provided with a non-volatile memory 160, an operation receiving unit 170, a display unit 180, and a main control unit 190. In addition, the imaging apparatus 100 is realized by a digital still camera, for example, which images a target, generates image data (image), and records the generated image as image content (stationary image content or movie content). Moreover, the imaging apparatus 100 is one example of the information processing apparatus and the imaging apparatus described in the appended claims.

The lens group 111 is a lens group which collects incident light from a target, and the light collected by the lens group is incident on the imaging element 131 via the diaphragm 112. The lens group 111 is configured by a focus lens for adjusting a focal point, a zoom lens for adjusting magnification of a target included in an image, and the like, and a specific arrangement configuration will not be shown in the drawings and will not be described herein. In addition, the lenses included in the lens group 111 are driven by the optical system control unit 113 so as to move in a front-back direction with respect to a target. In so doing, a focusing function and a zooming function are realized.

The diaphragm 112 adjusts the light intensity of the incident light which passes through the lens group 111, and the adjusted light is incident on the imaging element 131. That is, the diaphragm 112 adjusts the light intensity of the incident light which passes through the lens group 111, and the light intensity (that is, exposure) to be supplied to the imaging element 131 is determined. In addition, the diaphragm 112 is driven by the optical system control unit 113 so as to adjust aperture of the diaphragm.

The optical system control unit 113 drives the lenses included in the lens group 111 and the diaphragm 112 based on an instruction from the main control unit 190. In addition, the optical system control unit 113 obtains positions of the lenses included in the lens group 111 and a state (opening or closing state) of the diaphragm 112 and sequentially outputs the positions and the states to the main control unit 190.

The shutter unit 121 opens and blocks an optical path of the incident light from the target, which is incident on the imaging element 131, with a hood moving in a vertical direction and is driven by the shutter control unit 122. For example, when the optical path is opened, the shutter unit 121 supplies the incident light from the target to the imaging element 131.

The shutter control unit 122 drives the shutter unit 121 based on an instruction from the main control unit 190.

The imaging element 131 generates an electric signal (analog signal) by performing photoelectric conversion on the incident light from the target and supplies the generated electric signal as an image signal to the AFE 132. As the imaging element 131, a CCD (Charge Coupled Device), a CMOS (Complementary Metal Oxide Semiconductor), or the like can be used, for example.

In addition, as the imaging element 131, an imaging element which performs focal point detection based on a phase difference detecting scheme (phase difference AF (Auto Focus)) by receiving light transmitted through a part with a different exit pupil can be used. The imaging element which performs the phase difference AF outputs a phase difference detecting signal as well as an image signal (analog signal). For this reason, the image processing unit 133 can calculate a target distance of each area in an image corresponding to the image signal output from the imaging element 131 based on the phase difference detecting signal output from the imaging element 131. In addition, the target distance means a distance from the imaging apparatus 100 to the target.

The AFE 132 performs predetermined signal processing on the image signal (analog signal) supplied from the imaging element 131 based on the instruction from the main control unit 190 and converts the image signal, on which the predetermined signal processing has been performed, into a digital signal. In addition, the AFE 132 supplies the generated image signal (digital signal) to the image processing unit 133. For example, the AFE 132 performs signal processing such as noise removal and signal amplification on the image signal (analog signal) as the predetermined signal processing. In addition, the AFE 132 generates a timing pulse relating to the imaging operation of the imaging element 131 based on a reference clock supplied from the main control unit 190 and supplies the generated timing pulse to the imaging element 131.

The imaging processing unit 133 performs predetermined signal processing on the image signal (digital signal) supplied from the AFE 132 and generates image data (image signal) based on an instruction from the main control unit 190. The image processing unit 133 then compresses the generated image data and supplies the compressed image data to the content storage unit 140. For example, the image processing unit 133 performs signal processing such as white balance correction, gamma correction, black level correction, image compression, pixel interpolation processing, color conversion processing, and the like, as the predetermined signal processing, on the image signal (digital signal) supplied from the AFE 132. In addition, the image processing unit 133 performs predetermined computation processing with the use of the generated image data (image signal) and performs image processing for contrast, brightness, saturation, white balance, sharpness, and the like.

The photometric unit 135 is a photometric unit for performing automatic exposure processing and is used for measuring brightness around a target. That is, the photometric unit 135 can measure an exposure state of a target, an image of which has been formed as an optical image by the imaging element 131.

The content storage unit 140 stores thereon the image data supplied from the image processing unit 133 as image content (image file) based on an instruction from the main control unit 190.

The microphone 151 is a built-in microphone in the imaging apparatus 100, and sound from surroundings of the imaging apparatus 100 is input thereto. Then, the microphone 151 converts the input surrounding sound into an electric signal (analog signal) and supplies the electric signal generated by the conversion as an audio signal (analog signal) to the A/D conversion unit 152.

The A/D conversion unit 152 converts the audio signal (analog signal) output from the microphone 151 into a digital signal and outputs the audio signal (digital signal) generated by the conversion to the audio analysis processing unit 153.

The audio analysis processing unit 153 extracts feature amounts from the audio signal by analyzing the audio signal supplied from the A/D conversion unit 152 and outputs the extracted feature amounts to the main control unit 190. The audio analysis processing unit 153 is realized by a spectrum analyzer circuit which can extract volume and frequency distribution of the audio signal as feature amounts of the audio signal.

The non-volatile memory 160 is a semiconductor memory which can maintain stored contents even while power is not supplied. As the non-volatile memory 160, a flash memory or an EEPROM (Electrically Erasable and Programmable Read Only Memory) can be used, for example.

The operation receiving unit 170 is an operation receiving unit which receives an operation performed by a user and outputs a control signal (operation signal) in accordance with the received operation contents to the main control unit 190. The operation receiving unit 170 corresponds to a shutter button 171 (shown in FIG. 7A and the like), a mode dial, or the like. The mode dial is an operation member for setting various imaging modes. When a specific imaging mode (sound/image determination mode, for example) is set by the mode dial, an imaging mode shown in the first embodiment of the present disclosure is set.

The shutter button 171 is a button used for performing various operations (a half-pressing operation and a completely pressing operation) for recording a stationary image. When the half-pressing operation is performed, AF (auto focus) processing, AE (automatic exposure) processing, AWB (automatic white balance) processing, EF (electronic flash) processing, and the like are started. In addition, when the completely pressing operation is performed, various kinds of processing for recording the image signal (analog signal) read from the imaging element 131 as image content (image file) on the content storage unit 140 are performed.

The display unit 180 is a display panel (liquid crystal finder, for example) which displays the image data output from the image processing unit 133 based on an instruction from the main control unit 190. For example, the display unit 180 displays a setting screen for performing various kinds of setting and an image (a so-called through image, a live view image) generated by the imaging element 131. As the display unit 180, a display panel such as an LCD (Liquid Crystal Display) or an organic EL (Electro Luminescence) panel can be used.

The main control unit 190 controls each component in the imaging apparatus 100 based on a control program stored on a memory (non-volatile memory 160, for example). The main control unit 190 is configured by a microprocessor, for example.

Functional Configuration Example of Imaging Apparatus

Figure 2:
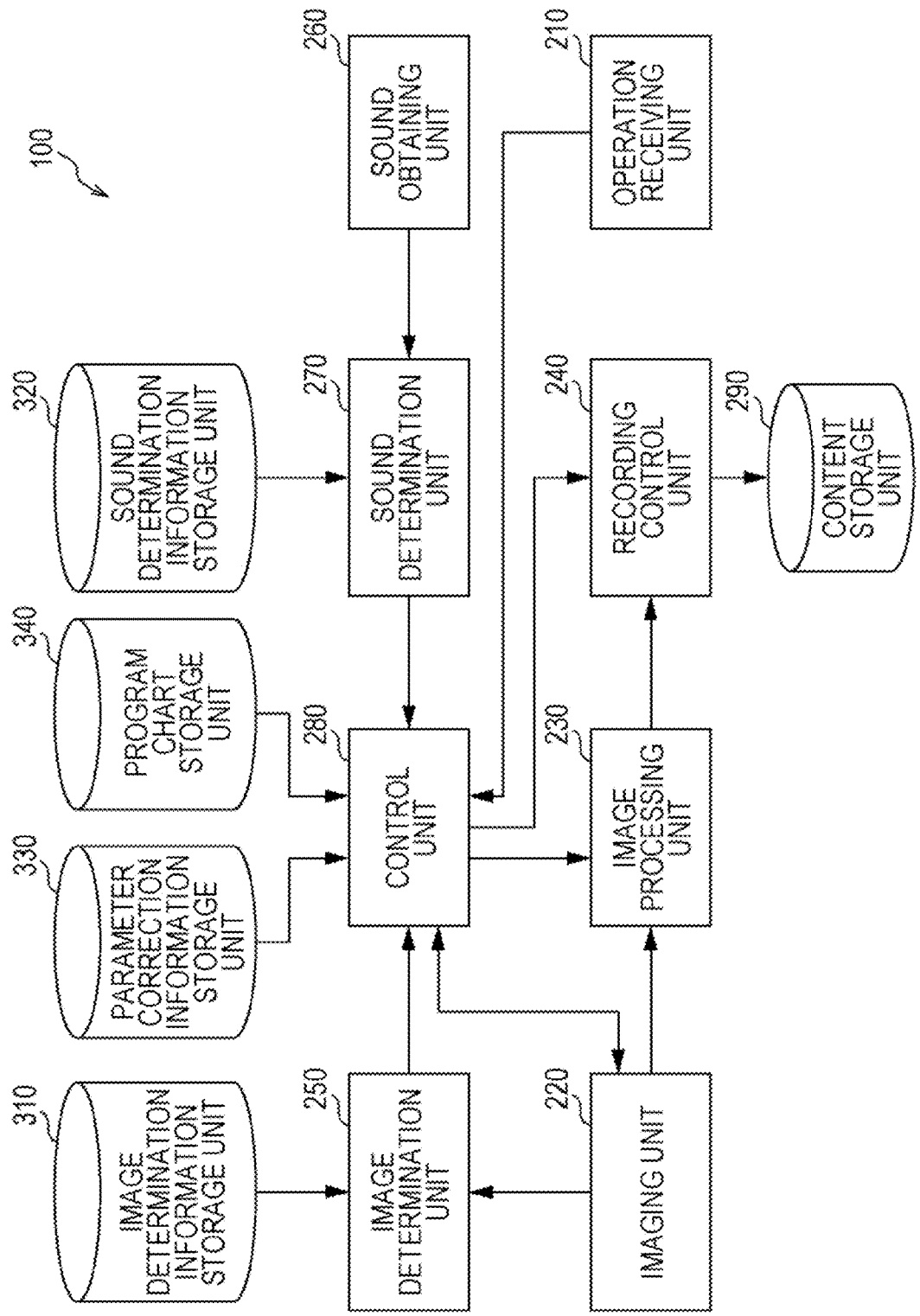
FIG. 2 is a block diagram showing a functional configuration example of the imaging apparatus according to the first embodiment of the present disclosure.

FIG. 2 is a block diagram showing a functional configuration example of the imaging apparatus 100 according to the first embodiment of the present disclosure.

The imaging apparatus 100 is provided with an operation receiving unit 210, an imaging unit 220, an image processing unit 230, a recording control unit 240, an image determination unit 250, a sound obtaining unit 260, a sound determination unit 270, a control unit 280, and a content storage unit 290. In addition, the imaging apparatus 100 is provided with an image determination information storage unit 310, a sound determination information storage unit 320, a parameter correction information storage unit 330, and a program chart storage unit 340. Moreover, the operation receiving unit 210 corresponds to the operation receiving unit 170 shown in FIG. 1, for example, and the content storage unit 290 corresponds to the content storage unit 140 shown in FIG. 1, for example.

The imaging unit 220 images a target, generates an image (image data) based on an instruction from the control unit 180, and supplies the generated image to the image processing unit 230, the image determination unit 250, and the control unit 280. In addition, the imaging unit 220 performs an imaging operation based on settings selected by the control unit 280. Moreover, the imaging unit 220 corresponds to the lens group 111, the diaphragm 112, the optical system control unit 113, the shutter unit 121, the shutter control unit 122, the imaging element 131, and the AFE 132 shown in FIG. 1, for example.

The image processing unit 230 performs predetermined signal processing on the image (image data) supplied from the imaging unit 220 based on an instruction from the control unit 280 and supplies the image (image data), on which the signal processing has been performed, to the recording control unit 240. In addition, the image processing unit 230 corresponds to the image processing unit 133 shown in FIG. 1, for example.

The recording control unit 240 compresses the image (image data) supplied from the image processing unit 230 and causes the content storage unit 290 to record therein the compressed image (image data) as image content (image file) based on the instruction from the control unit 280. In addition, the recording control unit 240 corresponds to the image processing unit 133 and the main control unit 190 shown in FIG. 1, for example.

The image determination unit 250 determines a type of an object included in the image generated by the imaging unit 220 with the use of image determination information stored on the image determination information storage unit 310 and outputs the determination result to the control unit 280.

For example, a determination method using matching processing can be used as a determination method for determining the type of the object. The matching processing is processing in which feature amounts of two images as comparison targets are compared, and a degree of similarity in the feature amounts of the two images is calculated based on the comparison result, and it is determined whether or not the two images coincide with each other based on the degree of similarity. For example, it is determined that the two images as the comparison targets do not coincide with each other when the calculated degree of similarity is less than a threshold value, and it is determined that the two images as comparison targets coincide with each other when the calculated degree of similarity is equal to or greater than the threshold value, for example. As the matching processing, a determination method (see Japanese Unexamined Patent Application Publication No. 2004-133637, for example) based on matching between a template in which luminance distribution information of each object (a horse, fish, or a human face, for example) is recorded and an actual image can be used. In addition, when the object as a determination target is a human face (specific object), a determination method based on feature amounts of a part corresponding to a skin tone included in an image, a human face, and the like can be used.

In addition, a detection method in which an object (human body, an animal, a train, a vehicle, or the like) included in an image is detected with the use of gradient intensity and a gradient direction of luminance in an image can be used, for example (see Japanese Unexamined Patent Application Publication No. 2010-67102, for example).

In addition, the image determination unit 250 determines an object moving state and a target distance. The object moving state can be determined by performing matching processing (that is, matching processing for determining an area of the same object) between pixels configuring two images, which are adjacent in a time axis and calculating a number of pixels moving between the images. The object target distance can be calculated based on a determined size of the object in the image, for example. As described above, the control unit 280 may calculate the target distance based on various kinds of information output from the imaging unit 220 (imaging element 131). In addition, the image determination unit 250 corresponds to the main control unit 190 shown in FIG. 1, for example. Moreover, the image determination unit 250 is an example of the second determination unit in the appended claims.

The sound obtaining unit 260 obtains sound from the surroundings of the imaging apparatus 100 and outputs the obtained sound data (sound) to the sound determination unit 270. In addition, the sound obtaining unit 260 corresponds to the microphone 151 shown in FIG. 1, for example.

The sound determination unit 270 determines a target, which generates sound, based on the sound data output from the sound obtaining unit 260 with the use of sound determination information stored on the sound determination information storage unit 320 and outputs the determination result to the control unit 280. For example, the sound determination unit 270 extracts feature amounts from the sound data output from the sound obtaining unit 260 and compares the extracted feature amounts and the sound determination information (feature amounts relating to sound) stored on the sound determination information storage unit 320 to calculate a degree of similarity. Then, when the calculated degree of similarity exceeds a threshold value, the sound determination unit 270 determines that an object associated with the sound determination information, the degree of similarity of which exceeds the threshold value, is present. For example, the sound data output from the sound obtaining unit 260 is sampled by A/D conversion processing and converted into digital data. In addition, processing such as frequency analysis or the like is performed on the digital data at an appropriate time interval, and the digital data is converted into a parameter representing a spectrum or other acoustic features of the sound. In so doing, time-series feature amounts relating to sound are extracted. In addition, matching processing with the extracted time-series feature amounts is performed with the use of the sound determination information (feature amounts relating to sound) stored on the sound determination information storage unit 320, and the determination result is output as a result of the matching processing. In addition, other existing methods may be used as the audio analysis method and the audio recognition method. Moreover, the sound obtaining unit 260 can determine the moving state and the target distance of the determined object. The moving state of the object can be determined based on feature amounts or the like of unique sound that the object generates while moving. The target distance of the object can be determined based on volume or the like of sound. In addition, the sound determination unit 270 corresponds to the A/D conversion unit 152, the audio analysis processing unit 153, and the main control unit 190 shown in FIG. 1, for example. In addition, the sound determination unit 270 is an example of the first determination unit in the appended claims.

The control unit 280 controls each component in the imaging apparatus 100 based on various control programs. For example, the control unit 280 performs control to determine settings during the imaging operation of the imaging unit 220 based on the surrounding sound obtained by the sound obtaining unit 260 and the image generated by the imaging unit 220.

Specifically, the control unit 280 determines the settings during the imaging operation of the imaging unit 220 based on the determination result by the sound determination unit 270 and the determination result by the image determination unit 250. That is, the control unit 280 determines the settings during the imaging operation of the imaging unit 220 based on a comparison result between an object (first object) determined by the sound determination unit 270 and an object (second object) determined by the image determination unit 250.

In such a case, the control unit 280 selects a parameter (first parameter) relating to the settings based on the first object and selects a parameter (second parameter) relating to the settings based on the second object. In addition, the control unit 280 can correct the first parameter based on at least one of the moving state and the target distance relating to the first object. Moreover, the control unit 280 can correct the second parameter based on at least one of the moving state and the target distance relating to the second object. Then, the control unit 280 selects settings during the imaging operation of the imaging unit 220 with the use of any of the first parameter and the second parameter based on whether or not the first object and the second object coincide with each other. Specifically, the control unit 280 selects the settings during the imaging operation of the imaging unit 220 with the use of the first parameter when the first object and the second object coincide with each other. On the other hand, the control unit 280 selects the setting during the imaging operation of the imaging unit 220 with the use of the second parameter when the first object and the second object do not coincide with each other. In addition, the control unit 280 corresponds to the main control unit 190 shown in FIG. 1, for example.

The image determination information storage unit 310 stores image determination information (feature amounts relating to an image) used for the determination processing by the image determination unit 250 and supplies the stored image determination information to the image determination unit 250. The contents stored on the image determination information storage unit 310 will be described in detail with reference to FIG. 3. In addition, the image determination information storage unit 310 corresponds to the non-volatile memory 160 shown in FIG. 1, for example.

The sound determination information storage unit 320 stores sound determination information (feature amounts relating to sound) used for the determination processing by the sound determination unit 270 and supplies the stored sound determination information to the sound determination unit 270. In addition, the contents stored on the sound determination information storage unit 320 will be described in detail with reference to FIG. 4. Moreover, the sound determination information storage unit 320 corresponds to the non-volatile memory 160 shown in FIG. 1, for example.

The parameter correction information storage unit 330 stores parameter correction information used for camera control parameter correction processing by the control unit 280 and supplies the stored parameter correction information to the control unit 280. In addition, the contents stored on the parameter correction information storage unit 330 will be described in detail with reference to FIG. 5. Moreover, the parameter correction information storage unit 330 corresponds to the non-volatile memory 160 shown In FIG. 1, for example.

The program chart storage unit 340 stores a program chart used for camera control parameter determination processing by the control unit 280 and supplies the stored program chart to the control unit 280. In addition, the program chart will be described in detail with reference to FIG. 6. Moreover, the program chart storage unit 340 corresponds to the non-volatile memory 160 shown in FIG. 1, for example.

Example of Contents Stored on Image Determination Information Storage Unit

FIG. 3 is a diagram schematically showing an example of contents stored on the image determination information storage unit 310 according to the first embodiment of the present disclosure.

The image determination information storage unit 310 stores determination information (determination information relating to an image) for determining a type of an object included in an image generated by the imaging unit 220. The image determination information storage unit 310 stores a type 311, a feature amount 312, and a camera control parameter 313 of an object so as to be associated with each other.

The type 311 of the object is a type of an object included in the image generated by the imaging unit 220. According to the first embodiment of the present disclosure, a horse, fish, a human face, and the like will be shown as examples of the types of objects as determination objects.

The feature amount 312 is determination information (image identification data) for determining the type of the object included in the image generated by the imaging unit 220. That is, the image determination unit 250 determines the type of the object included in the image generated by the imaging unit 220 with the use of the feature amount 312.

As described above, a determination method based on matching between a template in which luminance distribution information of each target (a horse, fish, or a human face, for example) and an actual image can be used, for example, as the determination method. When the determination method based on matching is used as the determination method as described above, the template which records therein the luminance distribution information of each target is stored as the feature amount 312.

The camera control parameter 313 is a camera control parameter set during the imaging operation of the imaging unit 220. For example, information on a position in a program chart stored on the program chart storage unit 340 is stored as the camera control parameter 313.

Example of Contents Stored on Sound Determination Information Storage Unit

Figure 4:
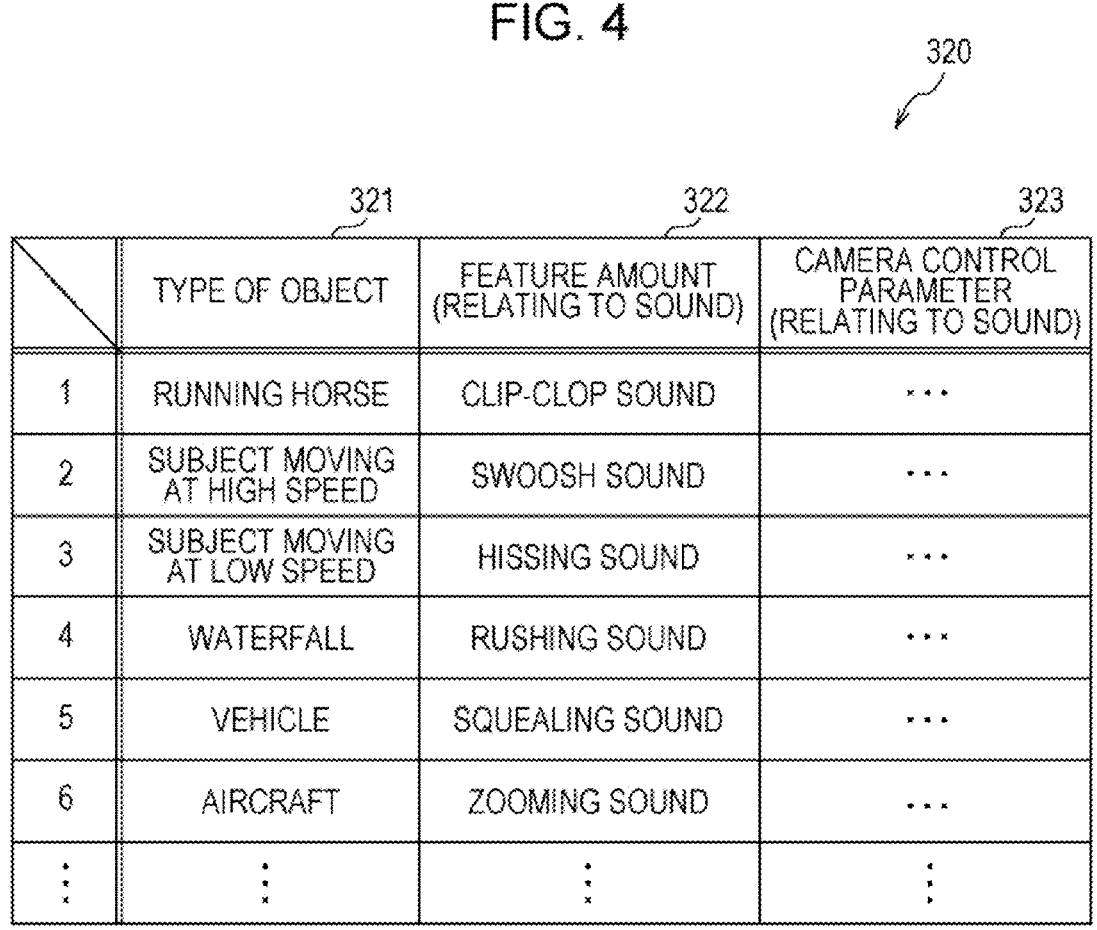
FIG. 4 is a diagram schematically showing an example of contents stored on a sound determination information storage unit according to the first embodiment of the present disclosure.

FIG. 4 is a diagram schematically showing an example of contents stored on the sound determination information storage unit 320 according to the first embodiment of the present disclosure.

The sound determination information storage unit 320 stores determination information (determination information relating to sound) for determining a type of an object which generates sound obtained by the sound obtaining unit 260. The sound determination information storage unit 320 stores thereon a type 321, a feature amount 322, and a camera control parameter 323 of the object so as to be associated with each other.

The type 321 of the object is a type of an object which generates sound obtained by the sound obtaining unit 260. In addition, FIG. 4 shows a running horse, a waterfall, a vehicle, and the like as examples of the types of objects as determination objects.

The feature amount 322 is determination information (sound identification data) for determining a type of an object which generates sound obtained by the sound obtaining unit 260. That is, the sound determination unit 270 determines the type of the object, which generates sound obtained by the sound obtaining unit 260, with the use of the feature amount 322. In order to simplify description, FIG. 4 shows sound, which is generated by objects, with characters in a pseudo manner as feature amounts.

As described above, the determination method based on matching between a time-series feature amount relating to sound generated by each object (a horse, fish, or a human face, for example) and a time-series feature amount relating to sound obtained by the sound obtaining unit 260 can be used as the determination method. When the determination method based on matching is used as the determination method as described above, the time-series feature amount relating to sound generated by each target is stored as the feature amount 322.

The camera control parameter 323 is a camera control parameter set during the imaging operation of the imaging unit 220. For example, information on a position in the program chart stored on the program chart storage unit 340 is stored as the camera control parameter 323. The camera control parameter 313 shown in FIG. 3 is a camera control parameter selected based on image information while the camera control parameter 323 is a camera control parameter selected based on sound information.

Example of Contents Stored on Parameter Correction Information Storage Unit

FIG. 5 is a diagram schematically showing an example of contents stored on the parameter correction information storage unit 330 according to the first embodiment of the present disclosure.

The parameter correction information storage unit 330 stores parameter correction information for correcting a camera control parameter (first parameter) selected by the control unit 280. The parameter correction information storage unit 330 stores thereon a type 331 of an object and parameter correction information 332 so as to be associated with each other.

The type 331 of the object is a type of an object which generates sound obtained by the sound obtaining unit 260. According to the first embodiment of the present disclosure, a subject moving at a high speed, a subject moving at a low speed, and the like are shown as examples of the types of objects as the determination objects.

The parameter correction information 332 is information for correcting the camera control parameter (first parameter) based on the type of the object which generates sound obtained by the sound obtaining unit 260. That is, the control unit 280 corrects the camera control parameter (first parameter), which has been selected based on the sound obtained by the sound obtaining unit 260, with the use of the parameter correction information 332. The camera control parameter (first parameter) will be described in detail with reference to FIG. 6.

Program Chart

FIG. 6 is a diagram showing an example of the program chart stored on the program chart storage unit 340 according to the first embodiment of the present disclosure. In addition, the program chart (program AE (Automatic Exposure)) is used for determining an aperture and a shutter speed in accordance with brightness of the target.

In a program chart 341 shown in FIG. 6, a vertical axis represents an aperture value (AV) of the lens, and a horizontal axis represents a shutter speed (TV: Time Value). In addition, an inclined line (shown as a dotted line) represents an exposure value (EV).

As described above, the control unit 280 selects the camera control parameter (first parameter) based on sound information with the use of the target determined by the sound determination unit 270 and the program chart stored on the program chart storage unit 340.

In addition, the control unit 280 selects the camera control parameter (second parameter) based on image information with the use of the target determined by the image determination unit 250 and the program chart stored on the program chart storage unit 340.

For example, it is assumed that the sound determination information storage unit 320 stores "a horse" as the type 321 of the object and "a position 342 in the program chart 341" as the camera control parameter 323 so as to be associated with each other. In such a case, when the target determined by the sound determination unit 270 is a horse, the control unit 280 selects the camera control parameter (first parameter) corresponding to the position 342 in the program chart 341. In addition, the control unit 280 corrects the camera control parameter (first parameter), which has been thus determined based on the sound information, in accordance with a speed of the target (horse). The speed of the target can be determined by the sound determination unit 270. For example, the sound determination unit 270 can identify a horse running fast (a subject moving at a high speed) and a horse running slowly (a subject moving at a low speed) with the use of the sound determination information in the sound determination information storage unit 320.

For example, when the sound determination unit 270 detects a horse running fast, it is preferable to raise the shutter speed. For this reason, the control unit 280 selects the camera control parameter (first parameter), the position 342 of which is shifted to a position 343 on a solid line 345 in the program chart 341. On the other hand, when the sound determination unit 270 detects a horse running slowly, for example, it is preferable to lower the shutter speed. For this reason, the control unit 280 selects the camera control parameter (first parameter), the position 342 of which is shifted to a position 344 on the solid line 345 in the program chart 341.

As described above, the control unit 280 can determine the camera control parameter (an aperture value, a shutter speed, an exposure value) based on the sound information with the use of the program chart. In addition, the control unit 280 can also select the camera control parameter based on the image information in the same manner.

According to the first embodiment of the present disclosure, an example in which a first parameter is selected with the use of the camera control parameter 323 by the sound determination information storage unit 320 and the parameter is corrected with the use of the speed of the object which is selected by the sound determination unit 270 will be shown. However, another configuration is also applicable in which a parameter corresponding to a position in the program chart is determined based on brightness information obtained by the photometric unit 135 and the parameter is corrected with the use of the speed of the object determined by the sound determination unit 270, for example. In addition, the same can be applied to correct the camera control parameter based on the image information.

As described above, the control unit 280 can correct the camera control parameter based on the sound information with the use of at least one of the moving state and the target distance of the object. In addition, the control unit 280 can correct the camera control parameter based on the image information with the use of at least one of the moving state and the target distance of the object.

In addition, the shifting from the position 346 to a position 348 on a dotted line 349 will be described later in a second embodiment of the present disclosure.

Example of Imaging State Using Imaging Apparatus

FIGS. 7A to 8B are diagrams simply showing relationships between targets as objects to be imaged by the imaging apparatus 100 and imaging ranges according to the first embodiment of the present disclosure.

Figure 7A:
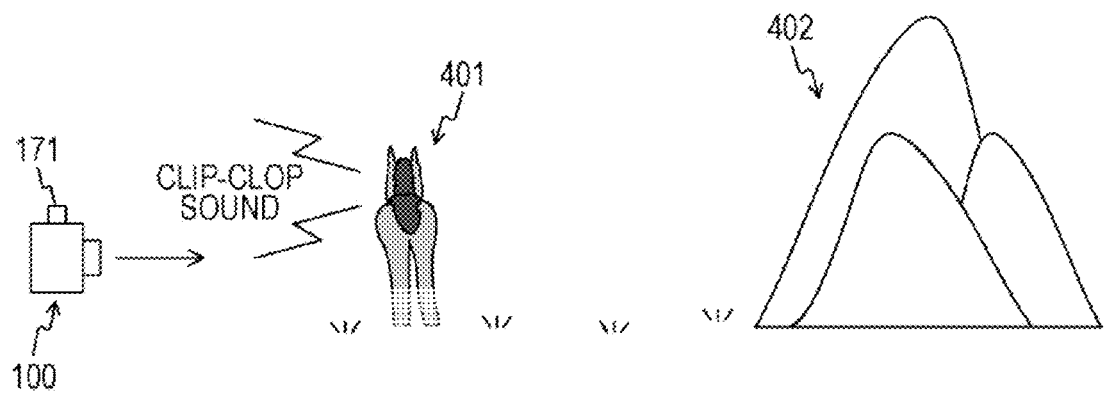
FIGS. 7A and 7B are diagrams simply showing relationships between targets as objects to be imaged by the imaging apparatus and imaging ranges according to the first embodiment of the present disclosure.
Figure 7B:
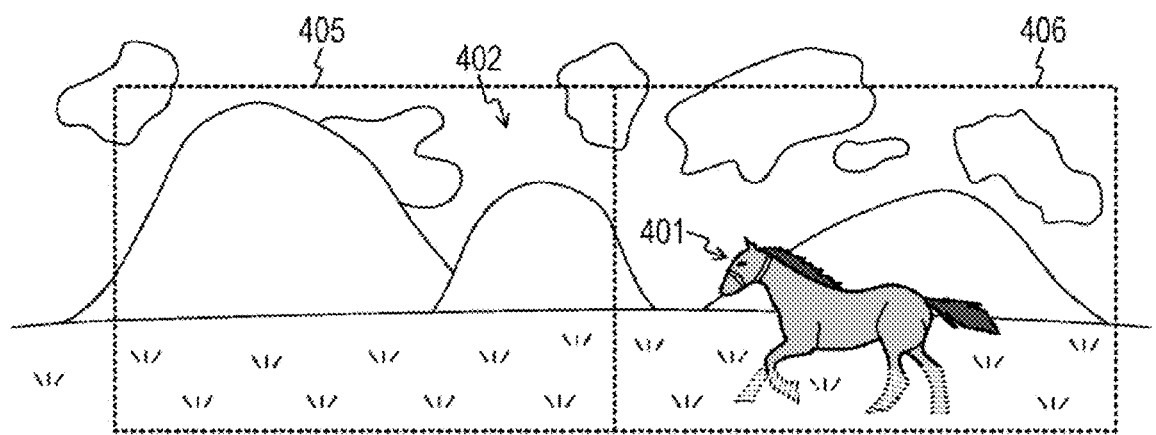
Figure 8A:
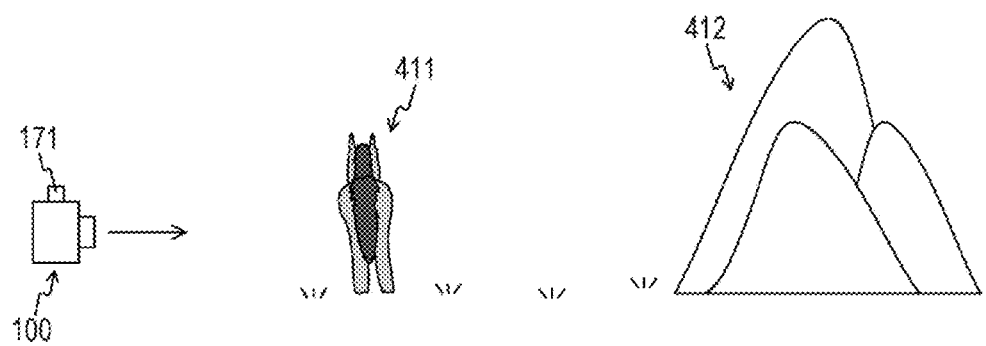
FIGS. 8A and 8B are diagrams simply showing relationships between targets as objects to be imaged by the imaging apparatus and imaging ranges according to the first embodiment of the present disclosure.
Figure 8B:
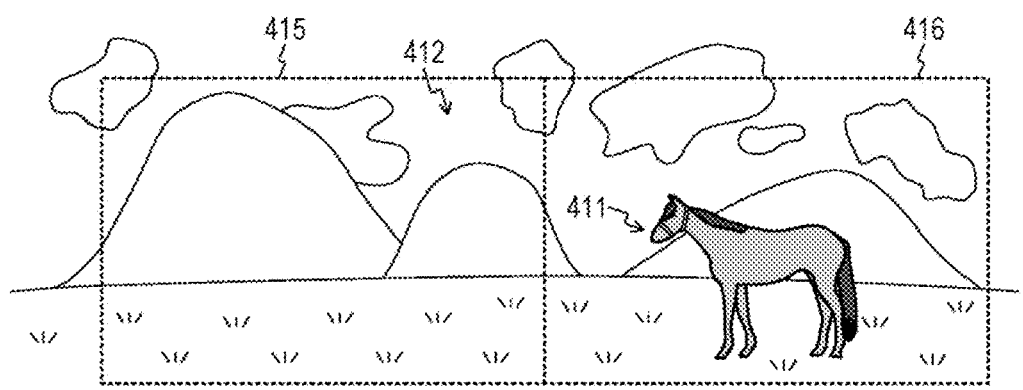

FIGS. 7A and 8A show side views of the imaging apparatus 100 and the targets. In addition, FIGS. 7B and 8B show imaging ranges of the targets as objects to be imaged by the imaging apparatus 100.

FIGS. 7A and 7B show relationships between targets and imaging ranges when a running horse 401 and surroundings thereof (mountains 402, for example) are the targets.

Description will be given on the assumption that running sound of the running horse 401 (shown as "clip-clop sound" in FIG. 7A) can be obtained by the sound obtaining unit 260 since a distance between the imaging apparatus 100 and the running horse 401 is relatively short in the example shown in FIGS. 7A and 7B.

Here, the running horse 401 is not included in an imaging range 405 while the running horse 401 is included in an imaging range 406 as shown in FIG. 7B. For this reason, when the imaging range 406 is imaged by the imaging unit 220, an object (running horse) specified based on the sound obtained by the sound obtaining unit 260 coincides (substantially coincides) with an object (horse) specified based on the image generated by the imaging unit 220. However, when the imaging range 405 is imaged by the imaging unit 220, the object (running horse) specified based on the sound obtained by the sound obtaining unit 260 does not coincide with objects (mountains, grass) specified based on the image generated by the imaging unit 220. If the camera control parameter is selected only based on the sound obtained by the sound obtaining unit 260, for example, the camera control parameter is selected using the sound generated by the object which is not included in the imaging range. For this reason, there is a concern that an appropriate camera control parameter may not be set for an image corresponding to the imaging range 405. Thus, the camera control parameter is selected using both the sound information and the image information according to the first embodiment of the present disclosure.

FIGS. 8A and 8B show relationships between targets and imaging ranges when a stopping horse 411 and surroundings thereof (mountains 412, for example) are the targets. Here, description will be given on the assumption that the sound obtaining unit 260 does not obtain the sound relating to the stopping horse 411 since the stopping horse 411 does not generate sound while a distance between the imaging apparatus 100 and the stopping horse 411 is relatively short in the example shown in FIGS. 8A and 8B. In addition, it is also assumed that objects other than the horse do not generate sound.

Here, the stopping horse 411 is not included in an imaging range 415 while the stopping horse 411 is included in an imaging range 416 as shown in FIG. 8B. However, the sound obtaining unit 260 does not obtain the sound (sound relating to the stopping horse 411) even when the imaging range 416 is imaged by the imaging unit 220. For this reason, an object (none) specified based on the sound obtained by the sound obtaining unit 260 does not coincide with an object (horse) specified based on the image generated by the imaging unit 220. In addition, an object (none) specified based on the sound obtained by the sound obtaining unit 260 does not coincide with objects (mountains, grass) specified based on the image generated by the imaging unit 220 when the imaging range 415 is imaged by the imaging unit 220. In both cases, there is a concern that an appropriate camera control parameter may not be set in the same manner as in the example shown in FIGS. 7A and 7B if the camera control parameter is selected only based on the sound obtained by the sound obtaining unit 260, for example.

Example of Relationship Between Target and Camera Control Parameter

FIGS. 9A to 11B are diagrams showing relationships between images generated by the imaging unit 220 and a camera control parameter selected by the control unit 280 according to the first embodiment of the present disclosure.

Figure 9A:
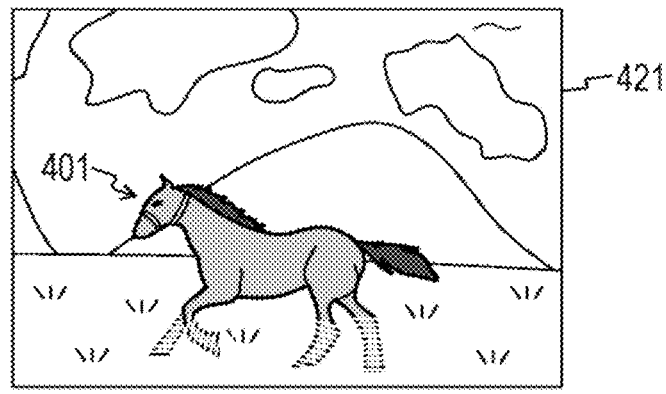
FIGS. 9A and 9B are diagrams showing a relationship between an image generated by an imaging unit and a camera control parameter selected by a control unit according to the first embodiment of the present disclosure.
Figure 11A:
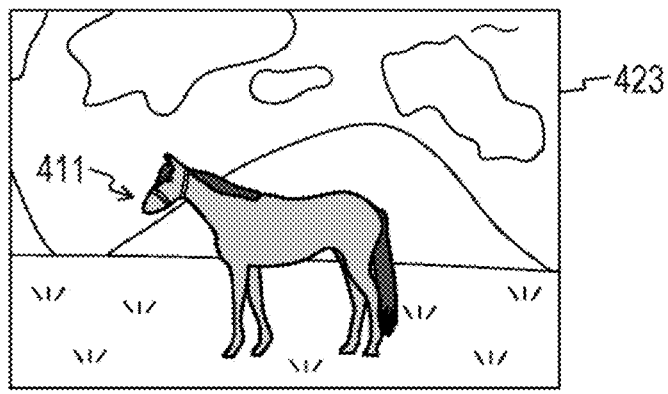
FIGS. 11A and 11B are diagrams showing a relationship between an image generated by the imaging unit and a camera control parameter selected by the control unit according to the first embodiment of the present disclosure.

Here, an image 421 shown in FIG. 9A is an image corresponding to an imaging range 406 shown in FIG. 7B. In addition, an image 422 shown in FIG. 10A is an image corresponding to the imaging range 405 shown in FIG. 7B and the imaging range 415 shown in FIG. 8B. Moreover, an image 423 shown in FIG. 11A is an image corresponding to the imaging range 416 shown in FIG. 8B.

Figure 9B:

During the imaging operation for the image 421 shown in FIG. 9A, an object (running horse) specified based on the sound obtained by the sound obtaining unit 260 coincides (substantially coincides) with an object (horse) specified based on the image generated by the imaging unit 220 as shown in FIG. 9B. In such a case, the control unit 280 selects the camera control parameter (first parameter) based on the sound information as settings for the imaging operation.

Here, it is assumed that the image 422 shown in FIG. 10A is an image corresponding to the imaging range 405 shown in FIG. 7B. In such a case, during the imaging operation for the image 422 shown in FIG. 10A, an object (running horse) specified based on the sound obtained by the sound obtaining unit 260 does not coincide with objects (grass, mountains) specified based on the image generated by the imaging unit 220 as shown in FIG. 10B. In such a case, the control unit 280 selects the camera control parameter (second parameter) based on the image information as settings for the imaging operation.

In addition, it is assumed that the image 422 shown in FIG. 10A is an image corresponding to the imaging range 415 shown in FIG. 8B. In such a case, during the imaging operation for the image 422 shown in FIG. 10A, an object (none) specified based on the sound obtained by the sound obtaining unit 260 does not coincide with objects (grass, mountains) specified based on the image generated by the imaging unit 220 as shown in FIG. 10C. In such a case, the control unit 280 selects the camera control parameter (second parameter) based on the image information as settings for the imaging operation.

Figure 11B:

In addition, during the imaging operation of the image 423 shown in FIG. 11A, an object (none) specified based on the sound obtained by the sound obtaining unit 260 does not coincide with an object (horse) specified based on the image generated by the imaging unit 220 as shown in FIG. 11B. In such a case, the control unit 280 selects the camera control parameter (second parameter) based on the image information as settings for the imaging operation.

Moreover, it can also be assumed that a horse in a stopping state cries (like neighing). For example, when the horse cries (like neighing) in the example shown in FIGS. 11A and 11B, an object (horse) specified based on the sound obtained by the sound obtaining unit 260 coincides with an object (horse) specified based on the image generated by the imaging unit 220. In such a case, the control unit 280 can select the camera control parameter (first parameter) based on the sound information as settings for the imaging operation.

Operation Example of Imaging Apparatus

Figure 12:
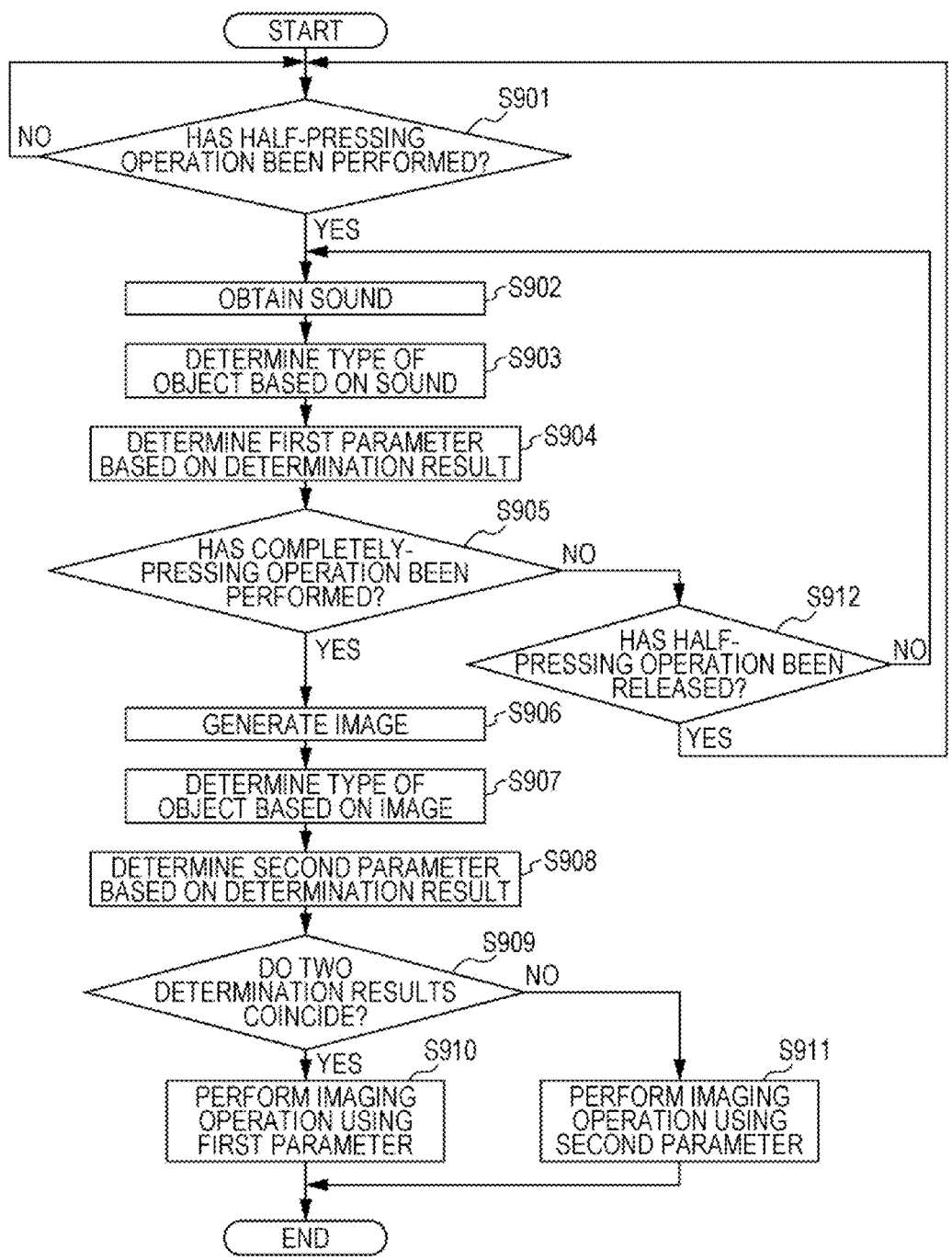
FIG. 12 is a flowchart showing an example of a processing procedure for camera control parameter determination processing by the imaging apparatus according to the first embodiment of the present disclosure.

FIG. 12 is a flowchart showing an example of processing procedure for the camera control parameter determination processing by the imaging apparatus 100 according to the first embodiment of the present disclosure.

First, the control unit 280 determines whether or not a half-pressing operation has been performed on the shutter button 171 (Step S901) and continues monitoring when the half-pressing operation has not been performed on the shutter button 171. When the half-pressing operation has been performed on the shutter button 171 (Step S901), the sound obtaining unit 260 obtains sound from the surroundings of the imaging apparatus 100 (Step S902). In addition, Step S902 is an example of the procedure for obtaining sound in the appended claims.

Next, the sound determination unit 270 determines a type of the object which generates the sound obtained by the sound obtaining unit 260 (Step S903). Subsequently, the control unit 280 selects the camera control parameter (first parameter) based on the sound information with the use of the determination result (Step S904).

Subsequently, the control unit 280 determines whether or not a completely pressing operation has been performed on the shutter button 171 (Step S905). When the completely pressing operation has not been performed (Step S905), the control unit 280 determines whether or not the half-pressing operation performed on the shutter button 171 has been released (Step S912) and returns to Step S901 when the half-pressing operation has been released. On the other hand, the control unit 280 returns to Step S902 when the half-pressing operation performed on the shutter button 171 has not been released (Step S912). When the completely pressing operation has been performed on the shutter button 171 (Step S905), the imaging unit 220 images the target and generates an image (Step S906). In addition, Step S906 is an example of the procedure for obtaining images in the appended claims.

Subsequently, the image determination unit 250 determines a type of the object included in the image generated by the imaging unit 220 (Step S907). Then, the control unit 280 selects the camera control parameter (second parameter) based on the image information with the use of the determination result (Step S908).

Subsequently, the control unit 280 compares the determination result by the sound determination unit 270 with the determination result by the image determination unit 250 and determines whether or not the determination results coincide (or substantially coincide) with each other (Step S909). That is, it is determined whether or not an object determined by the sound determination unit 270 coincides (or substantially coincides) with an object determined by the image determination unit 250. Here, if the object determined by the sound determination unit 270 is a "running horse", and the object determined by the image determination unit 250 is a "horse", the objects coincide with each other. That is, a case where the objects coincide with each other is a case in which the types of the objects are the same while the states thereof are different.

When the determination result by the sound determination unit 270 coincides (or substantially coincides) with the determination result by the image determination unit 250 (Step S909), the control unit 280 performs control for performing the imaging operation with the use of the first parameter (Step S910). That is, when the determination results coincide (or substantially coincide) with each other (Step S910), the camera control parameter (first parameter) based on the sound information is selected as the settings for the imaging operation (Step S910). Then, the imaging operation is performed based on the first parameter. The image generated by the imaging operation is stored as image content on the content storage unit 290.

When the determination result by the sound determination unit 270 does not coincide with the determination result by the image determination unit 250 (Step S909), the control unit 280 performs control for performing the imaging operation with the use of the second parameter (Step S911). That is, when the determination results do not coincide with each other (Step S910), the camera control parameter (second parameter) based on the image information is selected as the settings for the imaging operation (Step S911). Then, the imaging operation is performed based on the second parameter. The image generated by the imaging operation is stored as image content on the content storage unit 290. In addition, Steps S909 to S911 correspond to an example of the procedure for selecting settings in the appended claims.

For example, when the running horse 401 is included in the imaging range as shown in FIGS. 9A and 9B, the determination result by the sound determination unit 270 coincides (substantially coincides) with the determination result by the image determination unit 250 (Step S909). For this reason, the control unit 280 selects the camera control parameter (first parameter) based on the sound information and performs control for performing the imaging operation with the use of the camera control parameter (first parameter) (Step S910). The camera control parameter (first parameter) based on the sound information is a parameter on which correction for raising the shutter speed (correction from the position 342 to the position 343) has been made as shown in FIG. 6.

For example, when the running horse 401 is not included in the imaging range (including both a case in which the horse generates running sound and a case in which the horse does not generate running sound) as shown in FIGS. 10A to 10C, the determination result by the sound determination unit 270 does not coincide with the determination result by the image determination unit 250 (Step S909). For this reason, the control unit 280 selects the camera control parameter (second parameter) based on the image information and performs control for performing the imaging operation with the use of the camera control parameter (second parameter) (Step S911). In addition, the camera control parameter (second parameter) based on the image information is a parameter set in accordance with a type (grass, mountains) of the object determined by the image determination unit 250.

For example, when the stopping horse 411 is included in the imaging range (while horse is not crying) as shown in FIGS. 11A and 11B, the determination result by the sound determination unit 270 does not coincide with the determination result by the image determination unit 250 (Step S909). For this reason, the control unit 280 selects the camera control parameter (second parameter) based on the image information and performs control for performing the imaging operation with the use of the camera control parameter (second parameter) (Step S911). When the sound obtaining unit 260 does not obtain sound as described above, the camera control parameter (first parameter) based on the sound information is not selected. In addition, the camera control parameter (second parameter) based on the image information selected in this example is a parameter set in accordance with a type (horse) of the object determined by the image determination unit 250.

As described above, the sound obtained by the sound obtaining unit 260 and the image generated by the imaging unit 220 are analyzed, and a camera control parameter is selected with the use of the analysis result according to the first embodiment of the present disclosure. In so doing, it is possible to perform an imaging operation while an optimal camera control parameter is set. For example, when an object which generates sound is included in an imaging range, it is possible to perform the imaging operation while an optimal camera control parameter for the object is set. In so doing, it is possible to easily obtain an image with a sense of realism in consideration of sound generated by the object included in the imaging range. Even when the object which generates sound is present outside the imaging range, it is possible to set an appropriate camera control parameter based on the image information in the imaging range. That is, it is possible to appropriately select settings for the imaging operation in consideration of a relationship between the object which generates sound and objects other than the object which generates sound.

Although the above description was given of the first embodiment of the present disclosure in which the horse positioned in front of mountains was exemplified as the object which generated sound, the first embodiment of the present disclosure can be applied to another state where both an object which does not generate sound and an object which generates sound are present. For example, the first embodiment of the present disclosure can be applied to a state where an object which does not generate sound is present and an object which generates sound is present in front of the object which does not generate sound. For example, the first embodiment of the present disclosure can be applied to a case in which an aircraft in an airport, a vehicle in a racing circuit, or the like is imaged.

Second Embodiment

In the first embodiment of the present disclosure, the example in which the camera control parameter to be used for the imaging operation was selected in consideration of sound when an object which generates the sound is included in the image was shown. However, there is also a case where even when an object which generates sound is included in the image, an object other than the object which generates sound is a main object (an object on which the person who captures the image focuses, for example).

Thus, in a second embodiment of the present disclosure, an example where the camera control parameter based on the image information is selected if an object other than an object which generates sound is also included in the image as well as the object which generates sound will be shown. In addition, the configuration of the imaging apparatus according to the second embodiment of the present disclosure is substantially the same as that in the examples shown in FIGS. 1 and 2. For this reason, a part of description of the common parts to those in the first embodiment of the present disclosure will be omitted.

Example in which a Plurality of Objects are Determined

Figure 13A:
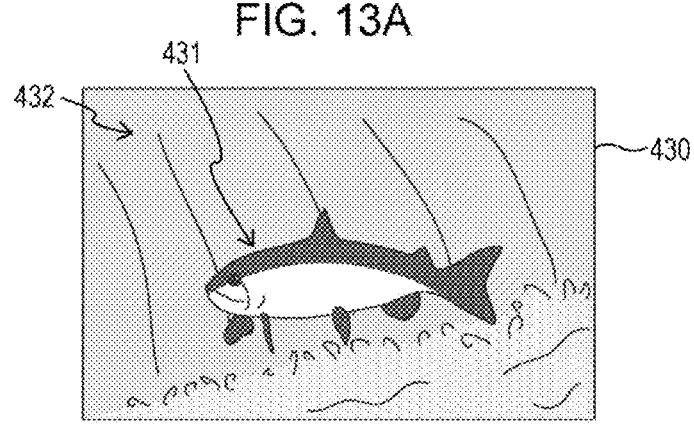
FIGS. 13A and 13B are diagrams showing a relationship between an image generated by the imaging unit and a depth map of the image according to a second embodiment of the present disclosure.
Figure 13B:
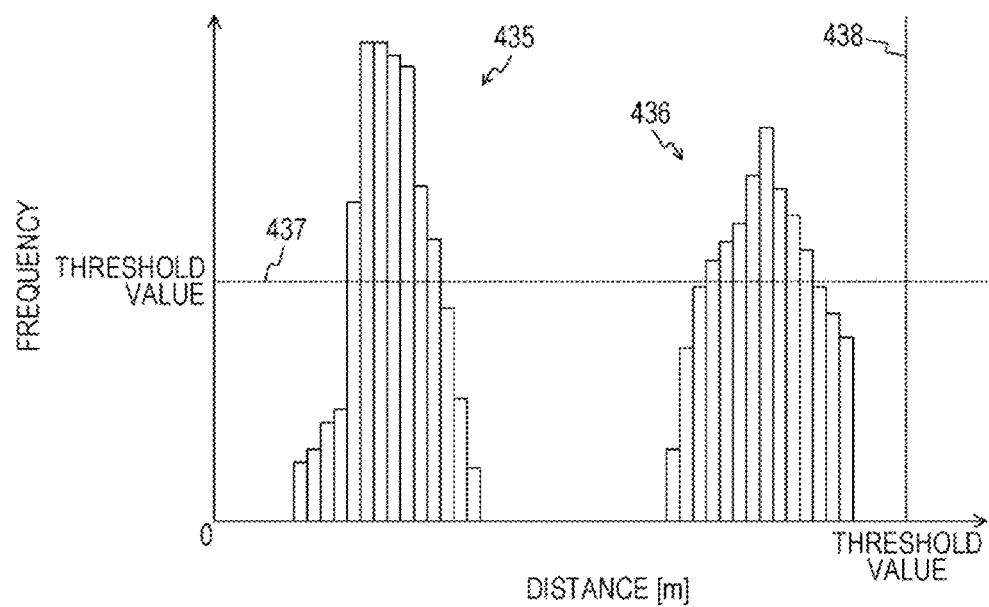

FIGS. 13A and 13B are diagrams showing a relationship between an image 430 generated by the imaging unit 220 and a depth map of the image 430 according to the second embodiment of the present disclosure.

FIG. 13A shows the image 430 generated by the imaging unit 220. The image 430 is assumed to be an image captured near a waterfall basin of waterfall 432 at a moment at which fish (a salmon, for example) 431 jumps out from water. For this reason, the fish 431 suspended in the air is included in the image 430.

FIG. 13B shows the depth map of the image 430 generated by the imaging unit 220 as a histogram.

The histogram shown in FIG. 13B is a histogram showing a distribution state of the target distance relating to the target included in the image 430.

Here, the control unit 280 calculates the target distance relating to the image based on the image generated by the imaging unit 220 and various kinds of information (a lens position, a focusing position, for example) at the time of the image generation. For example, the control unit 280 can generate a so-called depth map and obtain the target distance relating to each area based on the depth map. Here, the depth map is a map configured by data representing the target distance. As a method for generating the depth map, various methods such as a TOF (Time Of Flight) scheme and blur amount analysis (depth from defocus) can be used. For example, the TOF scheme is a method in which the distance to the target is calculated based on light delay time until light emitted from a light source is reflected by the object and reaches a sensor and speed of the light.

When an imaging element which performs phase difference AF is used as the imaging element 131, the control unit 280 can generate the depth map based on a phase difference detecting signal output from the imaging element. That is, the control unit 280 obtains the target distance relating to each object included in the image generated by the imaging unit 220. In addition, the control unit 280 is an example of the target distance obtaining unit in the appended claims.

For example, the image 430 includes the fish 431 floating in the air, the waterfall 432 which is present behind the fish 431, and the waterfall basin thereof as shown in FIG. 13A. For this reason, the distance from the imaging apparatus 100 to the waterfall 432 and the waterfall basin is further than the distance from the imaging apparatus 100 to the fish 431.

When a plurality of objects with different target distances are included in an image as described above, a mountain-like shape is formed for each object in the histogram representing the target distance distribution state. Specifically, a mountain-like shape 435 corresponding to the fish 431 which is relatively close to the imaging apparatus 100 and a mountain-like shape 436 corresponding to the waterfall 432 and the waterfall basin thereof which are relatively far from the imaging apparatus 100 are formed as shown in FIG. 13B.

When a plurality of mountain-like shapes are present in the histogram as described above, and there are a plurality of mountain-like shapes which are equal to or greater than a threshold value 437 shown by a dotted line, for example, it can be determined that a plurality of objects are present. However, if the plurality of mountain-like shapes in the histogram correspond to mountains relating to objects which exist at distant locations (mountains as background, for example), it is possible not to determine that a plurality of objects are present.

For example, when a mountain-like shape which is equal to or greater than the threshold value 438 shown by the dotted line is present, it is possible to make determination without considering a presence of the object corresponding to the mountain-like shape.

Hereinafter, description will be given of a method for selecting the camera control parameter (second parameter) based on the image information. According to the second embodiment of the present disclosure, the control unit 280 selects the camera control parameter (second parameter) based on the image information with the use of the calculated target distances and the determination result by the image determination unit 250. Specifically, when it is determined that a plurality of objects are present, the control unit 280 selects the camera control parameter (second parameter) based on the image information for each object based on the target distance calculated for each object. Even in such a case, it is possible to correct the camera control parameter (second parameter) based on the image information with the use of the parameter correction information stored on the parameter correction information storage unit 330.

For example, there is a case in which the image determination information storage unit 310 stores "fish" as the type 311 of the object and the position 346 in the program chart 341 as the camera control parameter 313 so as to be associated with each other. In such a case, when the object determined by the image determination unit 250 is fish, the control unit 280 selects the camera control parameter (second parameter) corresponding to the position 346 in the program chart 341. In addition, the control unit 280 corrects the camera control parameter (second parameter) selected based on the image information as described above in accordance with the target distance of the object (fish).

For example, it is preferable to raise the shutter speed when the target distance is short. For this reason, the control unit 280 selects the camera control parameter (second parameter), the position 346 of which is shifted to a position 347 on the left side on the dotted line 349 in the program chart 341. On the other hand, it is preferable to lower the shutter speed when the target distance is long, for example. For this reason, the control unit 280 selects the camera control parameter (second parameter), the position 346 of which is shifted to a position 348 on the right side on the dotted line 349 in the program chart 341.

As described above, the control unit 280 can select the camera control parameter (an aperture value, a shutter speed, an exposure value) based on the image information with the use of the program chart.

Example of Imaging State Using Imaging Apparatus

FIGS. 14A to 15B are diagrams simply showing relationships between targets to be imaged by the imaging apparatus 100 and imaging ranges according to the second embodiment of the present disclosure.

Figure 14A:
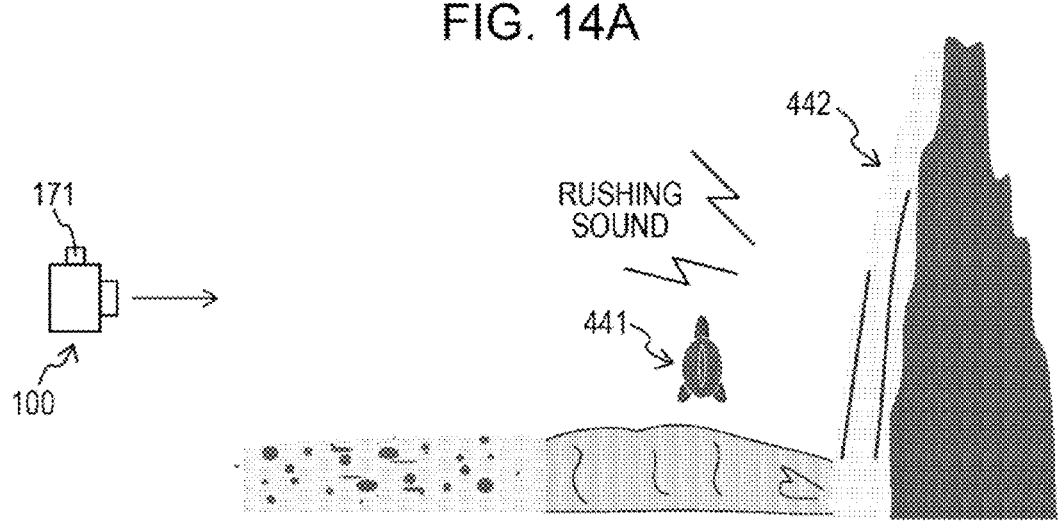
FIGS. 14A and 14B are diagrams simply showing relationships between targets as objects to be imaged by the imaging apparatus and imaging ranges according to the second embodiment of the present disclosure.
Figure 14B:
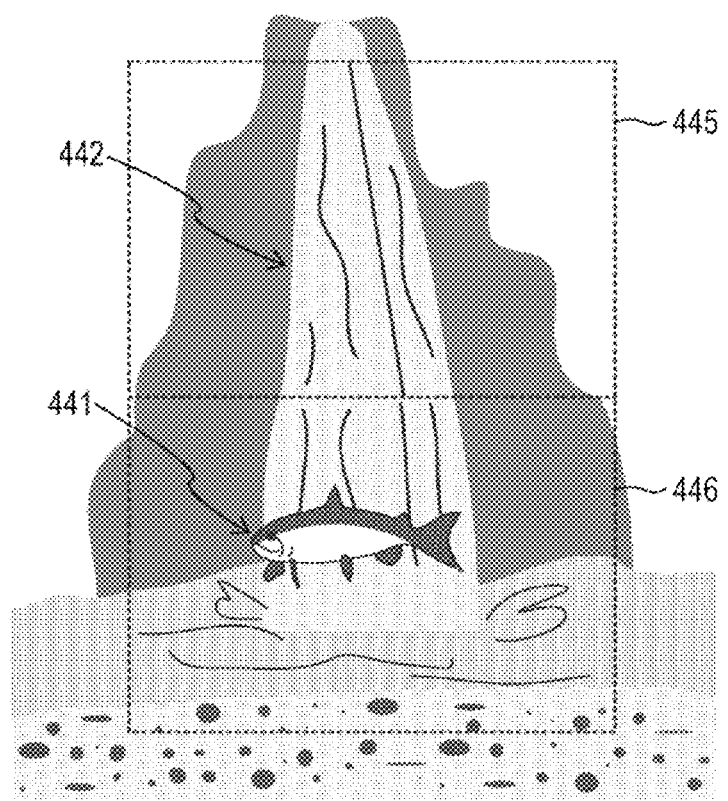
Figure 15A:
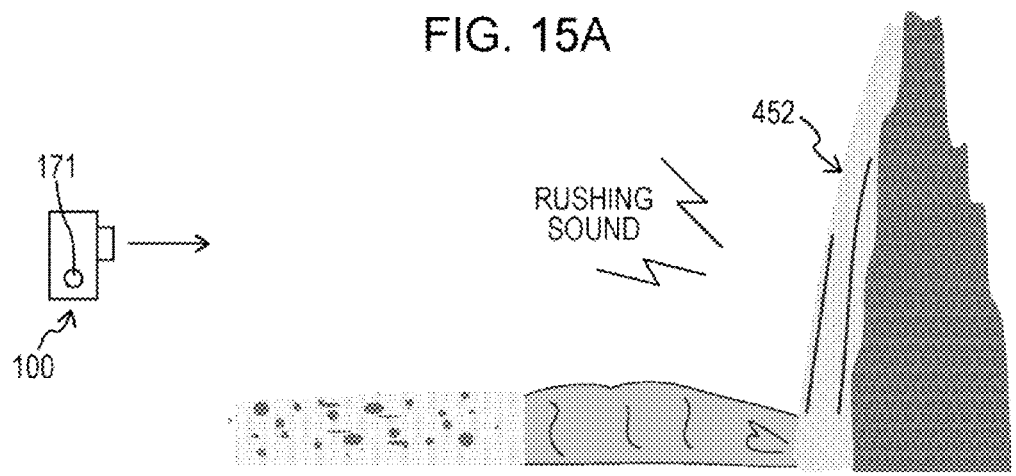
FIGS. 15A and 15B are diagrams simply showing a relationship between a target as an object to be imaged by the imaging apparatus and an imaging range according to the second embodiment of the present disclosure.
Figure 15B:
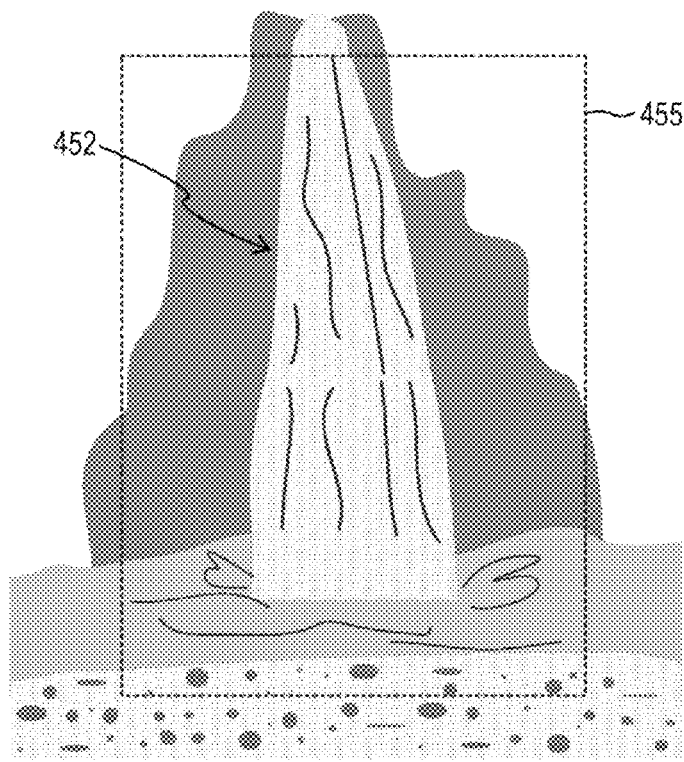

FIGS. 14A and 15A show side views of the imaging apparatus 100 and the targets. In addition, FIGS. 14B and 15B show imaging ranges of the targets to be imaged by the imaging apparatus 100.

FIGS. 14A and 14B show a relationship between targets and imaging ranges when a fish (a salmon, for example) 441 jumping out from water, a waterfall 442, and the surroundings of the waterfall basin thereof are targets. Hereinafter, description will be given on the assumption that a flowing sound of the waterfall 442 (represented as "rushing sound" in FIG.

14A) can be obtained by the sound obtaining unit 260 since the distance between the imaging apparatus 100 and the waterfall 442 is relatively short in the example shown in FIGS. 14A and 14B.

Here, the fish 441 is not included in an imaging range 445 while the fish 441 jumping out from the water is included in an imaging range 446 as shown in FIG. 14B. For this reason, an object (waterfall) specified based on the sound obtained by the sound obtaining unit 260 coincides (that is, partially coincides) with objects (waterfall, fish) specified based on the image generated by the imaging unit 220 when the imaging range 446 is imaged by the imaging unit 220. In addition, an object (waterfall) specified based on the sound obtained by the sound obtaining unit 260 coincides with an object (waterfall) specified based on the image generated by the imaging unit 220 when the imaging range 445 is imaged by the imaging unit 220.

Here, the first embodiment of the present disclosure was described as an example in which the camera control parameter based on the sound information was selected when the object specified based on the sound obtained by the sound obtaining unit 260 coincided with the object specified based on the image generated by the imaging unit 220. However, when the imaging range 446 is imaged by the imaging unit 220, there is a high possibility that the imaging operation may be performed on the fish 441 jumping out from the water as a main object rather than the waterfall 442 as background.

That is, it is assumed that the object (fish) specified based on the image generated by the imaging unit 220 is more important than the object (waterfall) specified based on the sound obtained by the sound obtaining unit 260. In such a case, there is a concern that an appropriate camera control parameter may not be set for an image of the target included in the imaging range 446 when the camera control parameter is selected only based on the sound obtained by the sound obtaining unit 260, for example. Thus, the second embodiment of the present disclosure will be described as an example in which the camera control parameter based on the image information is selected when another object is also present in an imaging range even if an object specified based on sound coincides with an object specified based on an image.

FIGS. 15A and 15B show relationships between targets and imaging ranges when a waterfall 452 and the surroundings of the waterfall basin are targets. Hereinafter, description will be given on the assumption that the flowing sound of the waterfall 452 (represented as "rushing sound" in FIG. 15A) can be obtained by the sound obtaining unit 260 since the distance between the imaging apparatus 100 and the waterfall 452 is relatively short in the example shown in FIGS. 15A and 15B.

Here, the waterfall 452 is included in an imaging range 455 as shown in FIG. 15B. In such a case, it is possible to select the camera control parameter in the same manner as in the imaging range 445 shown in FIG. 14B.

Example of Relationship Between Target and Camera Control Parameter

FIGS. 16A to 18B are diagrams showing a relationship between images generated by the imaging unit 220 and camera control parameters selected by the control unit 280 according to the second embodiment of the present disclosure.

Here, an image 461 shown in FIG. 16A is an image corresponding to the imaging range 446 shown in FIG. 14B. In addition, an image 462 shown in FIG. 17A is an image corresponding to the imaging range 445 shown in FIG. 14B. Moreover, an image 463 shown in FIG. 18A is an image corresponding to an imaging range 455 shown in FIG. 15B.

As shown in FIG. 16B, during the image operation for the image 461 shown in FIG. 16A, an object (waterfall) specified based on the sound obtained by the sound obtaining unit 260 coincides (partially coincides) with objects (fish, waterfall) specified based on the image generated by the imaging unit 220. However, another object (fish) relating to a target distance (short) which is different from a target distance (long) relating to the coincident object (waterfall) is included in the image generated by the imaging unit 220. In such a case, the control unit 280 selects the camera control parameter (second parameter) based on the image information as the settings for the imaging operation.

As shown in FIG. 17B, during the imaging operation for the image 462 shown in FIG. 17A, an object (waterfall) specified based on the sound obtained by the sound obtaining unit 260 coincides with an object (waterfall) specified based on the image generated by the imaging unit 220. In addition, another object relating to a target distance which is different from a target distance relating to the coincident object (waterfall) is not included in the image generated by the imaging unit 220. In such a case, the control unit 280 selects the camera control parameter (first parameter) based on the sound information as the settings for the imaging operation.

As shown in FIG. 18B, during the imaging operation for the image 463 shown in FIG. 18A, an object (waterfall) specified based on the sound obtained by the sound obtaining unit 260 coincides with an object (waterfall) specified based on the image generated by the imaging unit 220. In addition, another object relating to a target distance which is different from a target distance relating to the coincident object (waterfall) is not included in the image generated by the imaging unit 220. In such a case, the control unit 280 selects the camera control parameter (first parameter) based on the sound information as the settings for the imaging operation.

As described above, the control unit 280 selects a camera control parameter based on whether or not another object relating to a target distance which is different from a target distance relating to a first object is included in the image generated by the imaging unit 220.

Operation Example of Imaging Apparatus

FIG. 19 is a flowchart showing an example of a processing procedure for camera control parameter determination processing by the imaging apparatus 100 according to the second embodiment of the present disclosure. Since FIG. 19 shows a modified example of FIG. 12, the same reference numerals will be given to common components to those in FIG. 12, and a part of the description will be omitted.

After determining a type of an object included in the image generated by the imaging unit 220 (Step S907), the control unit 280 calculates a target distance of each object included in an imaging range (Step S921). Subsequently, the control unit 280 selects the camera control parameter (second parameter) based on the image information based on the calculated target distances and the determination result by the image determination unit 250 (Step S922).

When the determination result by the sound determination unit 270 coincides (or substantially coincides) with the determination result by the image determination unit 250 (Step S909), the control unit 280 determines whether or not an object other than the coincident object is present in the imaging range (Step S923). When an object other than the coincident object is not present in the imaging range (Step S923), the control unit 280 performs control for performing an imaging operation with the use of the first parameter (Step S910). On the other hand, when an object other than the coincident object is present in the imaging range (Step S923), the control unit 280 performs control for performing an imaging operation with the use of the second parameter (Step S911).

When a running horse 401 is included in the imaging range as shown in FIG. 9A, for example, the determination result by the sound determination unit 270 coincides (substantially coincides) with the determination result by the image determination unit 250 (Step S909). In addition, since a background (grass, mountains) of the running horse 401 is not determined as another object as described above, an object other than the running horse 401 is not present (Step S923). For this reason, the control unit 280 selects the camera control parameter (first parameter) based on the sound information and performs the control for performing the imaging operation with the use of the camera control parameter (first parameter) in the same manner as in the first embodiment of the present disclosure (Step S910). The camera control parameter (first parameter) based on the sound information is a parameter on which correction for raising the shutter speed has been performed (correction from the position 342 to the position 343) as shown in FIG. 6.

When the running horse 401 is not included in the imaging range (including both a case in which horse running sound is included and a case in which horse running sound is not included) as shown in FIG. 10A, for example, the determination result by the sound determination unit 270 does not coincide with the determination result by the image determination unit 250 (Step S909). For this reason, the control unit 280 selects the camera control parameter (second parameter) based on the image information and performs the control for performing the imaging operation with the use of the camera control parameter (second parameter) in the same manner as in the first embodiment of the present disclosure. Here, the camera control parameter (second parameter) based on the image information selected according to the second embodiment of the present disclosure is a parameter set in accordance with a target distance relating to an object (grass, mountains) determined by the image determination unit 250.

When a stopping horse 411 is included in the imaging range (while the horse is not crying) as shown in FIG. 11A, for example, the determination result by the sound determination unit 270 does not coincide with the determination result by the image determination unit 250 (Step S909). For this reason, the control unit 280 selects the camera control parameter (second parameter) based on the image information and performs the control for performing the imaging operation with the use of the camera control parameter (second parameter) (Step S911). Here, the camera control parameter (second parameter) based on the image information selected according to the second embodiment of the present disclosure is a parameter set in accordance with a target distance relating to an object (horse) determined by the image determination unit 250.

When the waterfall 442 is included in the imaging range as shown in FIG. 16A, for example, the determination result by the sound determination unit 270 coincides (partially coincides) with the determination result by the image determination unit 250 (Step S909). However, it is determined that an object (fish 441) other than the waterfall 442 is present as described above (Step S923). For this reason, the control unit 280 selects the camera control parameter (second parameter) based on the image information and performs the control for performing an imaging operation with the use of the camera control parameter (second parameter) (Step S911).

Since two objects are present in the example shown in FIGS. 16A and 16B, two parameters (a parameter based on the fish 441 and a parameter based on the waterfall 442 and the waterfall basin thereof) are determined as the camera control parameters (second parameters) based on the image information. For example, the parameter based on the fish 441 is a parameter on which correction for raising the shutter speed (correction from the position 346 to the position 347) has been performed as shown in FIG. 6. On the other hand, the parameter based on the waterfall 442 and the waterfall basin is a parameter on which correction for lowering the shutter speed (correction from the position 346 to the position 348) has been performed as shown in FIG. 6.

Since two parameters are selected as the camera control parameters (second parameters) based on the image information as described above, the control unit 280 performs control for performing an imaging operation with the use of any of the parameters (Step S911). In the case of setting in which an object positioned at the center of an imaging range is regarded as a main object, the control unit 280 performs control for performing an imaging operation with the use of the parameter based on the fish 441.

When only the waterfall 442 is included in the imaging range as shown in FIG. 17A, for example, the determination result by the sound determination unit 270 coincides with the determination result by the image determination unit 250 (Step S909). Since no object other than the waterfall 442 (including the waterfall basin thereof) is present, it is determined that a plurality of objects are not present (Step S923). For this reason, the control unit 280 selects the camera control parameter (first parameter) based on the sound information and performs the control for performing the imaging operation with the use of the camera control parameter (first parameter) (Step S910).

Since the example shown in FIGS. 18A and 18B is the same as FIGS. 17A and 17B, description will be omitted here.

As described above, the camera control parameter based on the image information is selected when an object other than an object which generates sound is also included as well as the object which generates sound according to the second embodiment of the present disclosure. In so doing, it is possible to set an optimal camera control parameter for a main object and perform an imaging operation even when an object other than an object which generates sound and is also included the image is a main object. That is, it is possible to appropriately select settings for the imaging operation in consideration of a relationship between an object which generates sound and an object other than the object which generates sound.

Although the second embodiment of the present disclosure was described above as an example in which a waterfall positioned behind a fish was the object which generates sound, the second embodiment of the present disclosure can be applied to another state in which an object which generates sound is present in the background and another object is present in front of the object which generates sound. For example, the second embodiment of the present disclosure can be applied to a state in which a large audience is present behind an object (which does not generate sound) which is present on a stage and the large audience is generating sound.

Third Embodiment

The description was given of the first embodiment of the present disclosure as an example in which the camera control parameter used for an imaging operation was selected in consideration of sound when an object which generates sound is included in an image. However, if a person is included in an image even when an object (not person) which generates sound is included in the image, there is also a case where the person is a main object.

Thus, a third embodiment of the present disclosure will be described as an example in which the camera control parameter based on the image information is used for the imaging operation if a person is included in the image even when an object (not person) which generates sound is included in the image. In addition, the configuration of the imaging apparatus according to the third embodiment of the present disclosure is substantially the same as that in the examples shown in FIGS. 1 and 2. For this reason, a part of description of common components to those in the first embodiment of the present disclosure will be omitted.

Example of Imaging State Using Imaging Apparatus

Figure 20A:
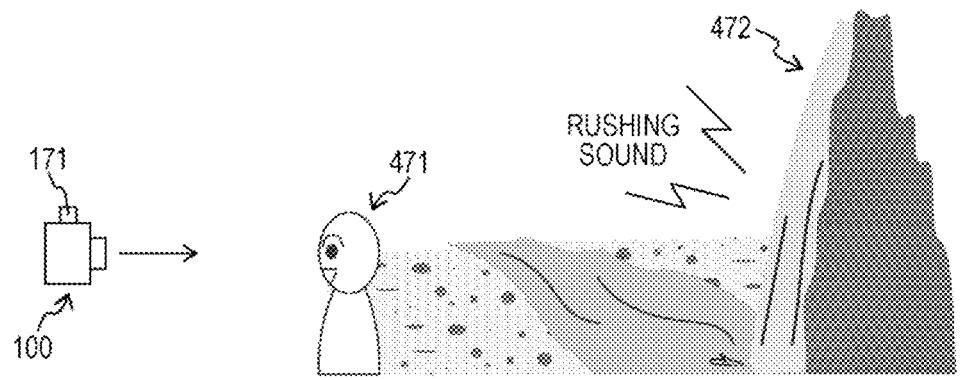
FIGS. 20A and 20B are diagrams simply showing relationships between targets as objects to be imaged by the imaging apparatus and imaging ranges according to a third embodiment of the present disclosure.
Figure 20B:
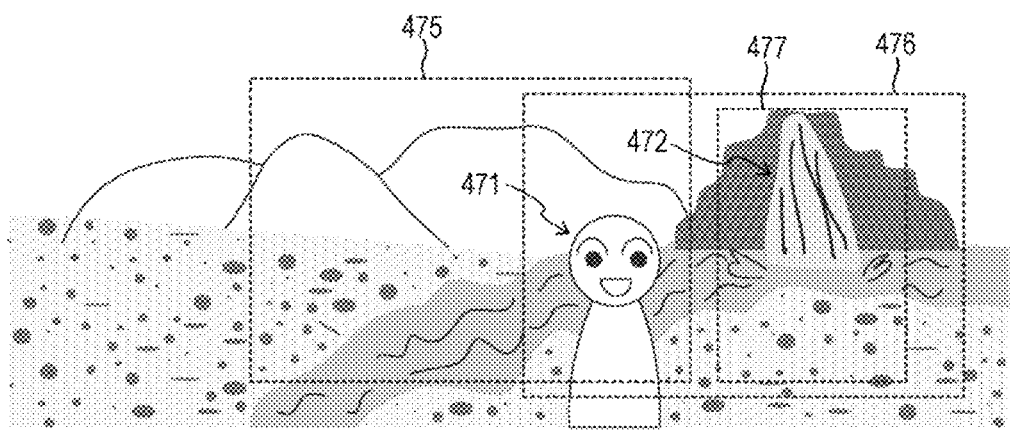

FIGS. 20A and 20B are diagrams simply showing relationships between targets to be imaged by the imaging apparatus 100 and imaging ranges according to the third embodiment of the present disclosure. FIG. 20A shows side views of the imaging apparatus 100 and the targets. In addition, FIG. 20B shows imaging ranges of the targets to be imaged by the imaging apparatus 100.

FIGS. 20A and 20B show relationships between targets and imaging ranges when a person 471 standing in front of a waterfall 472 and the surroundings of the waterfall 472 (a waterfall basin and river) are targets. Description will be given on the assumption that the sound obtaining unit 260 can obtain the flowing sound of the waterfall 472 (represented as "rushing sound" in FIG. 20A") since the distance between the imaging apparatus 100 and the waterfall 472 is relatively short in the example shown in FIGS. 20A and 20B.

Here, the waterfall 472 is not included in the imaging range 475 while the waterfall 472 is included in the imaging ranges 476 and 477 as shown in FIG. 20B. For this reason, an object (waterfall) specified based on the sound obtained by the sound obtaining unit 260 coincides (that is, partially coincides) with objects (person, waterfall) specified based on the image generated by the imaging unit 220 since the imaging range 476 is imaged by the imaging unit 220. In addition, an object (waterfall) specified based on the sound obtained by the sound obtaining unit 260 coincides with an object (waterfall) specified based on the image generated by the imaging unit 220 when the imaging range 477 is imaged by the imaging unit 220.

Here, the description was given of the first embodiment of the present disclosure as an example in which the camera control parameter based on the sound information was selected when an object specified based on sound obtained by the sound obtaining unit 260 coincides with an object specified based on an image generated by the imaging unit 220. However, it is possible to consider that there is a high possibility that the imaging operation may be performed while the person 471 standing in front of the waterfall 472 in the background is regarded as a main object when the imaging range 476 is imaged by the imaging unit 220.

That is, it can be considered that the object (person) specified based on the image generated by the imaging unit 220 is more important than the object (waterfall) specified based on the sound obtained by the sound obtaining unit 260. In such a case, there is a concern that an appropriate camera control parameter may not be set for an image of a target included in the imaging range 476 when the camera control parameter is selected only based on the sound obtained by the sound obtaining unit 260, for example. Thus, the third embodiment of the present disclosure will be described as an example in which the camera control parameter based on the image information is selected if there is a person in an imaging range even when an object specified based on sound coincides with an object specified based on an image.

The person 471 is included in the imaging range 475. Even in such a case, the camera control parameter based on the image information is selected in the same manner.

Example of Relationship Between Target and Camera Control Parameter

FIGS. 21A to 23B are diagrams showing relationships between images generated by the imaging unit 220 and camera control parameters selected by the control unit 280 according to the third embodiment of the present disclosure.

An image 481 shown in FIG. 21A is an image corresponding to the imaging range 476 shown in FIG. 20B. In addition, an image 482 shown in FIG. 22A is an image corresponding to the imaging range 475 shown in FIG. 20B. Moreover, an image 483 shown in FIG. 23A is an image corresponding to the imaging range 477 shown in FIG. 20B.

As shown in FIG. 21B, an object (waterfall) specified based on the sound obtained by the sound obtaining unit 260 coincides (partially coincides) with objects (a person, waterfall) specified based on the image generated by the imaging unit 220 during the imaging operation for the image 481 shown in FIG. 21A. However, a face of the person 471 is included in the image generated by the imaging unit 220. In such a case, the control unit 280 selects the camera control parameter (second parameter) based on the image information as the settings for the imaging operation.

As shown in FIG. 22B, an object (waterfall) specified based on the sound obtained by the sound obtaining unit 260 does not coincide with objects (person, mountains) specified based on the image generated by the imaging unit 220 during the imaging operation for the image 482 shown in FIG. 22A. In such a case, the control unit 280 selects the camera control parameter (second parameter) based on the image information as the settings for the imaging operation.

Figure 23A:
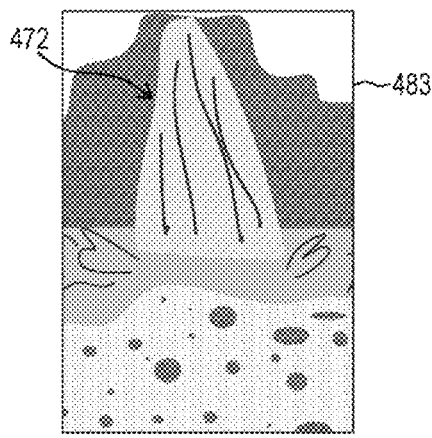
FIGS. 23A and 23B are diagrams showing a relationship between an image generated by the imaging unit and a camera control parameter selected by the control unit according to the third embodiment of the present disclosure.
Figure 23B:

As shown in FIG. 23B, an object (waterfall) specified based on the sound obtained by the sound obtaining unit 260 coincides with an object (waterfall) specified based on the image generated by the imaging unit 220 during the imaging operation for the image 483 shown in FIG. 23A. In addition, a human face is not included in the image generated by the imaging unit 220. In such a case, the control unit 280 selects the camera control parameter (first parameter) based on the sound information as the settings for the imaging operation.

As described above, the control unit 280 selects the camera control parameter based on whether or not a specific object (a human face, for example) is included in the image generated by the imaging unit 220.

Operation Example of Imaging Apparatus

FIG. 24 is a flowchart showing an example of a processing procedure for camera control parameter determination processing by the imaging apparatus 100 according to the third embodiment of the present disclosure. Since FIG. 24 shows a modified example of FIG. 12, the same reference numerals will be given to components common with those in FIG. 12, and a part of the description will be omitted.

When the determination result by the sound determination unit 270 coincides (or substantially coincides) with the determination result by the image determination unit 250 (Step S909), the control unit 280 determines whether or not a person (a human face) is present in the imaging range (Step S931). When a person (a human face) is not present in the imaging range (Step S931), the control unit 280 performs the control for performing the imaging operation with the use of the first parameter (Step S910). On the other hand, when a person (a human face) is present in the imaging range (Step S931), the control unit 280 performs the control for performing the imaging operation with the use of the second parameter (Step S911).

The same determination processing as that in the first embodiment of the present disclosure is performed in the examples shown in FIGS. 9A to 11B since a person is not included in the imaging range.

Similarly, the same determination processing as that in the second embodiment of the present disclosure is performed in the examples shown in FIGS. 16A to 18B since a person is not included in the imaging range.

When the waterfall 472 is included in the imaging range as shown in FIG. 21A, for example, the determination result by the sound determination unit 270 coincides (partially coincides) with the determination result by the image determination unit 250 (Step S909). However, it is determined that the person 471 is present in the imaging range as described above (Step S931). For this reason, the control unit 280 selects the camera control parameter (second parameter) based on the image information and performs the control for performing the imaging operation with the use of the camera control parameter (second parameter) (Step S911). In such a case, the control unit 280 performs the control for performing the imaging operation with the use of the parameter (the parameter selected with the use of the target information, for example) based on the person 471 (Step S911).

When the waterfall 472 is not included in the imaging range as shown in FIG. 22A, for example, the determination result by the sound determination unit 270 does not coincide with the determination result by the image determination unit 250 (Step S909). For this reason, the control unit 280 selects the camera control parameter (second parameter) based on the image information and performs the control for performing the imaging operation with the use of the camera control parameter (second parameter) (Step S911). Even in such a case, the control unit 280 performs the control for performing the imaging operation with the use of the parameter based on the person 471 (Step S911).

When the waterfall 472 is included in the imaging range as shown in FIG. 23A, for example, the determination result by the sound determination unit 270 coincides (partially coincides) with the determination result by the image determination unit 250 (Step S909). In such a case, it is determined that the person 471 is not present in the imaging range (Step S931). For this reason, the control unit 280 selects the camera control parameter (first parameter) based on the sound information and performs the control for performing the imaging operation with the use of the camera control parameter (first parameter) (Step S910).

As described above, the camera control parameter based on the image information is selected if a person is included in an image even when an object which generates sound is included in the image according to the third embodiment of the present disclosure. In so doing, it is possible to set an optimal camera control parameter for a person and perform an imaging operation even when the person is a main object in a case where an object which generates sound is included in the image. That is, it is possible to appropriately select settings for the imaging operation in consideration of a relationship between an object which generates sound and an object other than the object which generates sound.

The above embodiments of the present disclosure were described as examples in which a parameter selected based on an object determined by the sound determination unit 270 was corrected with the use of a determination result (a speed of the object, for example) by the sound determination unit 270. However, the parameter selected based on the object determined by the sound determination unit 270 may be corrected with the use of a determination result (a speed of the object, for example) by the image determination unit 250.

In addition, the above embodiments of the present disclosure were described as examples in which a parameter selected based on an object determined by the image determination unit 250 was corrected with the use of a determination result (a speed of the object, for example) by the image determination unit 250 or a target distance (a target distance of the object). However, the parameter selected based on the object determined by the image determination unit 250 may be corrected with the use of a determination result (a speed of the object or a target distance, for example) by the sound determination unit 270.

In addition, the control unit 280 may select the settings (settings for the imaging operation of the imaging unit 220) by another determination method based on surrounding sound obtained by the sound obtaining unit 260 and an image generated by the imaging unit 220.

For example, when fireworks sound has been determined by the sound determination unit 270, the control unit 280 may correct a parameter selected based on an object determined by the image determination unit 250 so as to be an optimal parameter for the fireworks. For example, when fireworks sound has been determined by the sound determination unit 270, the control unit 280 may set a fireworks mode as an imaging mode and set an optimal parameter based on the object determined by the image determination unit 250 while the fireworks mode is set. In so doing, it is possible to easily set an optimal parameter for fireworks by keeping the shutter button 171 in a half-pressed state when fireworks sequentially set off are imaged.

In addition, the above embodiments of the present disclosure were described as examples in which a period from a moment at which a half-pressing operation is performed on the shutter button 171 to a moment at which a completely pressing operation is performed is regarded as a sound determination period and a period during which the completely pressing operation is performed on the shutter button 171 is regarded as an image determination period. However, the sound determination processing and the image determination processing may be sequentially performed by regarding a period, during which a stationary image capturing mode is set, as the sound determination period and the image determination period. In addition, the sound determination period and the image determination period may be regularly or irregularly set or set in another period, during which the camera control parameter can be set, during the imaging operation.

Although the embodiments of the present disclosure were described as examples in which an aperture value, a shutter speed, and an exposure value are determined as the camera control parameter, the embodiments of the present disclosure can be applied to a case in which another camera control parameter is selected. For example, an optimal imaging parameter and an optimal image processing parameter in accordance with an object can be stored in advance so as to be associated with each object, and settings for an imaging operation can be selected with the use of each of the parameters.

Although the embodiments of the present disclosure were described as examples in which the imaging apparatus 100 was provided with an imaging unit, the embodiments of the present disclosure can be applied to an information processing apparatus with a detachable imaging unit. In addition, the embodiments of the present disclosure can be applied to an information processing apparatus such as a mobile phone with an imaging function or a mobile terminal device with an imaging function.

The aforementioned embodiments were illustrative examples for implementing the present disclosure, and items in the embodiments are in correspondence relationships with inventive items in the appended claims. Similarly, the inventive items in the appended claims are in correspondence relationships with items which are referred to in the same manner in the embodiments of the present disclosure. However, the present disclosure is not limited to the embodiments and can be implemented by adding various modifications to the embodiments without departing from the scope of the present disclosure.

In addition, the processing procedures described in the aforementioned embodiments may be understood as a method including the series of procedures, or may be understood as a program for causing a computer to execute the series of procedures or a recording medium which stores the program thereon. As the recording medium, a CD (Compact Disc), an MD (MiniDisc), a DVD (Digital Versatile Disc), a memory card, a Blue-ray disc (registered trademark) or the like can be used.

Moreover, the present disclosure can be configured as follows.

(1) An information processing apparatus including: a control unit configured to perform control for selecting settings for an imaging operation of an imaging unit based on surrounding sound obtained by a sound obtaining unit and an image generated by the imaging unit.

(2) The information processing apparatus according to (1), further including: a first determination unit configured to determine an object generating sound based on the surrounding sound obtained by the sound obtaining unit; and a second determination unit configured to determine an object included in the image based on the image generated by the imaging unit, wherein the control unit is configured to select the settings based on a determination result by the first determination unit and a determination result by the second determination unit.

(3) The information processing apparatus according to (2), wherein the control unit is configured to select the settings based on a comparison result between a first object as an object determined by the first determination unit and a second object as an object determined by the second determination unit.

(4) The information processing apparatus according to (3), wherein the control unit is configured to select a first parameter as a parameter relating to the settings based on the first object, select a second parameter as a parameter relating to the settings based on the second object, and select the settings with the use of any of the first parameter and the second parameter based on whether or not the first object coincides with the second object.

(5) The information processing apparatus according to (4), wherein the control unit is configured to select the settings with the use of the first parameter when the first object coincides with the second object and select the settings with the use of the second parameter when the first object does not coincide with the second object.

(6) The information processing apparatus according to (4) or (5), wherein the first determination unit is configured to determine the first object and at least one of a moving state and a target distance relating to the first object, and wherein the control unit is configured to correct the first parameter based on at least one of the moving state and the target distance relating to the first object.

(7) The information processing apparatus according to any one of (4) to (6), wherein the second determination unit is configured to determine the second object and at least one of a moving state and a target distance relating to the second object, and wherein the control unit is configured to correct the second parameter based on at least one of the moving state and the target distance relating to the second object.

(8) The information processing apparatus according to any one of (4) to (7), further including: a target distance obtaining unit configured to obtain a target distance relating to each object included in the image generated by the imaging unit, wherein the control unit is configured to select the settings with the use of any of the first parameter and the second parameter based on whether or not another object relating to a target distance which is different from a target distance relating to the first object is included in the image generated by the imaging unit.

(9) The information processing apparatus according to any one of (4) to (7), wherein the second determination unit is configured to determine whether or not a specific object is included in the image generated by the imaging unit, and wherein the control unit is configured to select the settings with the use of any of the first parameter and the second parameter based on whether or not the specific object is included in the image generated by the imaging unit.

(10) The information processing apparatus according to (9), wherein the second determination unit is configured to determine whether or not a human face as the specific object is included.

(11) An imaging apparatus including: a sound obtaining unit which configured to obtain surrounding sound; an imaging unit configured to image a target and generates an image; and a control unit configured to perform control for selecting settings for an imaging operation of the imaging unit based on the surrounding sound obtained by the sound obtaining unit and the image generated by the imaging unit.

(12) An information processing method including: obtaining sound from surroundings of an information processing apparatus; obtaining images generated by an imaging unit; and selecting settings for an imaging operation of the imaging unit based on the obtained sound and the obtained images.

(13) A program which causes a computer to: obtain sound from surroundings of an information processing apparatus; obtain images generated by an imaging unit; and select settings for an imaging operation of the imaging unit based on the obtained sound and the obtained images.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a control unit configured to perform control for selecting settings for an imaging operation of an imaging unit based on surrounding sound obtained by a sound obtaining unit and an image generated by the imaging unit;
a first determination unit configured to determine an object generating sound based on the surrounding sound obtained by the sound obtaining unit; and
a second determination unit configured to determine an object included in the image based on the image generated by the imaging unit,
wherein the control unit is configured to select the settings based on a determination result by the first determination unit and a determination result by the second determination unit,
wherein the control unit is configured to select the settings based on a comparison result between a first object as the object determined by the first determination unit and a second object as the object determined by the second determination unit, wherein the control unit is configured to select a first parameter as a parameter relating to the settings based on the first object, select a second parameter as a parameter relating to the settings based on the second object, and select the settings with the use of any of the first parameter and the second parameter based on whether or not the first object coincides with the second object, and wherein the control unit is configured to select the settings with the use of the first parameter when the first object coincides with the second object and select the settings with the use of the second parameter when the first object does not coincide with the second object.

2. The information processing apparatus according to claim 1, wherein the first determination unit is configured to determine the first object and at least one of a moving state and a target distance relating to the first object, and wherein the control unit is configured to correct the first parameter based on at least one of the moving state and the target distance relating to the first object.

3. The information processing apparatus according to 1, wherein the second determination unit is configured to determine the second object and at least one of a moving state and a target distance relating to the second object, and wherein the control unit is configured to correct the second parameter based on at least one of the moving state and the target distance relating to the second object.

4. The information processing apparatus according to claim 1, further comprising:

a target distance obtaining unit configured to obtain a target distance relating to each object included in the image generated by the imaging unit, wherein the control unit is configured to select the settings with the use of any of the first parameter and the second parameter based on whether or not another object relating to a target distance which is different from a target distance relating to the first object is included in the image generated by the imaging unit.

5. The information processing apparatus according to claim 1, wherein the second determination unit is configured to determine whether or not a specific object is included in the image generated by the imaging unit, and wherein the control unit is configured to select the settings with the use of any of the first parameter and the second parameter based on whether or not the specific object is included in the image generated by the imaging unit.

6. The information processing apparatus according to claim 5, wherein the second determination unit is configured to determine whether or not a human face as the specific object is included.

7. An information processing apparatus comprising:

a processor to perform control for selecting settings for an imaging operation of an imaging unit based on whether a first object which corresponds to surrounding sound obtained by a sound obtaining unit coincides with a second object detected in an image generated by the imaging unit, such that when the first object coincides with the second object the settings are selected based on the first object and when the first object does not coincide with the second object the settings are selected based on the second object;

a first determination unit configured to determine the first object; and a second determination unit configured to determine the second object.

8. The information processing apparatus according to claim 7, wherein the processor is configured to select a first parameter as a parameter relating to the settings based on the first object when the first object coincides with the second object, and to select a second parameter as a parameter relating to the settings based on the second object when the first object does not coincide with the second object.

9. An imaging apparatus comprising:

a sound obtaining unit configured to obtain surrounding sound;

an imaging unit configured to image a target and generate an image; and a control unit configured to perform control for selecting settings for an imaging operation of the imaging unit based on whether a first object which corresponds to the surrounding sound obtained by the sound obtaining unit coincides with a second object which corresponds to the target in the image generated by the imaging unit, such that when the first object coincides with the second object the settings are selected based on the first object and when the first object does not coincide with the second object the settings are selected based on the second object.

10. An information processing method comprising:

obtaining sound from surroundings of an information processing apparatus;

obtaining images generated by an imaging unit; and selecting settings for an imaging operation of the imaging unit based on whether a first object which corresponds to the obtained surrounding sound coincides with a second object detected in an image generated by the imaging unit, such that when the first object coincides with the second object the settings are selected based on the first object and when the first object does not coincide with the second object the settings are selected based on the second object.

11. A non-transitory computer readable medium having stored thereon a program which when executed causes a computer to:

obtain sound from surroundings of an information processing apparatus;

obtain images generated by an imaging unit; and select settings for an imaging operation of the imaging unit based on whether a first object which corresponds to the obtained surrounding sound coincides with a second object detected in an image generated by the imaging unit, such that when the first object coincides with the second object the settings are selected based on the first object and when the first object does not coincide with the second object the settings are selected based on the second object.

* * * * *